(12) United States Patent
Fujiwara et al.

(10) Patent No.: US 8,497,867 B2
(45) Date of Patent: Jul. 30, 2013

(54) INFORMATION PROCESSING SYSTEM, INFORMATION PROCESSING APPARATUS, DISPLAY PROCESSING METHOD THEREFOR, AND COMPUTER-READABLE STORAGE MEDIUM

(75) Inventors: Masato Fujiwara, Kawasaki (JP); Toru Kikuchi, Hino (JP); Daiki Kondo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 931 days.

(21) Appl. No.: 12/616,438

(22) Filed: Nov. 11, 2009

(65) Prior Publication Data

US 2010/0125792 A1    May 20, 2010

(30) Foreign Application Priority Data

Nov. 20, 2008  (JP) .................................. 2008-297095
Jan. 9, 2009   (JP) .................................. 2009-003993

(51) Int. Cl.
 *G09G 5/39*  (2006.01)
 *G06F 13/00* (2006.01)

(52) U.S. Cl.
 USPC ............ 345/538; 345/531; 345/536; 345/537

(58) Field of Classification Search
 USPC .......................................... 345/531, 536–538
 See application file for complete search history.

(56) References Cited

U.S. PATENT DOCUMENTS 6,147,703 A * 11/2000 Miller et al. ............... 348/220.1
2008/0021929 A1  1/2008 Fujiwara

FOREIGN PATENT DOCUMENTS

| JP | 11-146326    | 5/1999 |
| JP | 2000-232595  | 8/2000 |
| JP | 2003-101969  | 4/2003 |
| JP | 2008-026986  | 2/2008 |

* cited by examiner

*Primary Examiner* — Hau Nguyen
(74) *Attorney, Agent, or Firm* — Cowan, Liebowitz & Latman, P.C.

(57) ABSTRACT

An information processing system stores a plurality of content data having different display qualities for each content in a storage unit, and detects a user operation to instruct switching of a content displayed on a display screen, and determines a switching speed of content display on the display screen based on the detected user operation, and decides a distribution for content data of each display quality to be read out to a temporary memory unit based on the determined switching speed, and reads out the content data from the storage unit to the temporary memory unit in accordance with the decided distribution.

19 Claims, 27 Drawing Sheets

FIG. 6A

| | STRUCTURE A | STRUCTURE B | STRUCTURE C |
|---|---|---|---|
| TEMPORARY MEMORY AREA OF LOW QUALITY CONTENT DATA | CONTENT1 ~601A<br>CONTENT2 ~602A<br>CONTENT3 ~603A<br>CONTENT4 ~604A<br>CONTENT5 ~605A<br>CONTENT6 ~606A<br>CONTENT7 ~607A | CONTENT8 ~601B<br>CONTENT9 ~602B<br>CONTENT10 ~603B<br>CONTENT11 ~604B<br>CONTENT12 ~605B<br>CONTENT13 ~606B<br>CONTENT7 ~607B | CONTENT15 ~601C<br>CONTENT16 ~602C<br>CONTENT17 ~603C<br>CONTENT18 ~604C<br>CONTENT19 ~605C<br>CONTENT20 ~606C<br>CONTENT14 ~607C |
| TEMPORARY MEMORY AREA OF MIDDLE QUALITY CONTENT DATA | CONTENT1 ~608A<br>CONTENT2 ~609A<br>CONTENT3 ~610A<br>CONTENT4 ~611A<br>CONTENT5 ~612A<br>CONTENT6 ~613A<br>CONTENT7 ~614A | CONTENT8 ~608B<br>CONTENT9 ~609B<br>CONTENT10 ~610B<br>CONTENT11 ~611B<br>CONTENT12 ~612B<br>CONTENT13 ~613B<br>CONTENT7 ~614B | CONTENT15 ~608C<br>CONTENT16 ~609C<br>CONTENT17 ~610C<br>CONTENT18 ~611C<br>CONTENT19 ~612C<br>CONTENT20 ~613C<br>CONTENT14 ~614C |
| TEMPORARY MEMORY AREA OF HIGH QUALITY CONTENT DATA | CONTENT1 ~615A<br>CONTENT2 ~616A<br>CONTENT3 ~617A<br>CONTENT ~618A<br>CONTENT5 ~619A<br>CONTENT6 ~620A<br>CONTENT7 ~621A | CONTENT8 ~615B<br>~616B<br>CONTENT10 ~617B<br>~618B<br>CONTENT12 ~619B<br>~620B<br>CONTENT7 ~621B | ~615C<br>~616C<br>~617C<br>~618C<br>~619C<br>~620C<br>~621C |

FIG. 7B

| | STRUCTURE H | | STRUCTURE I | |
|---|---|---|---|---|
| TEMPORARY MEMORY AREA OF LOW RESOLUTION CONTENT DATA | CONTENT36 | ~701H | CONTENT36 | ~701I |
| | CONTENT37 | ~702H | CONTENT37 | ~702I |
| | CONTENT38 | ~703H | CONTENT38 | ~703I |
| | CONTENT32 | ~704H | CONTENT39 | ~704I |
| | CONTENT33 | ~705H | CONTENT40 | ~705I |
| | CONTENT34 | ~706H | CONTENT34 | ~706I |
| | CONTENT35 | ~707H | CONTENT35 | ~707I |
| TEMPORARY MEMORY AREA OF MIDDLE RESOLUTION CONTENT DATA | CONTENT36 | ~708H | CONTENT36 | ~708I |
| | CONTENT37 | ~709H | CONTENT37 | ~709I |
| | CONTENT38 | ~710H | CONTENT38 | ~710I |
| | CONTENT32 | ~711H | CONTENT39 | ~711I |
| | CONTENT33 | ~712H | CONTENT40 | ~712I |
| | CONTENT34 | ~713H | CONTENT34 | ~713I |
| | CONTENT35 | ~714H | CONTENT35 | ~714I |
| TEMPORARY MEMORY AREA OF HIGH RESOLUTION CONTENT DATA | CONTENT36 | ~715H | CONTENT36 | ~715I |
| | CONTENT37 | ~716H | CONTENT37 | ~716I |
| | CONTENT38 | ~717H | CONTENT38 | ~717I |
| | | ~718H | CONTENT39 | ~718I |
| | | ~719H | CONTENT40 | ~719I |
| | CONTENT34 | ~720H | CONTENT34 | ~720I |
| | CONTENT35 | ~721H | CONTENT35 | ~721I |

FIG. 8B

STRUCTURE C

TEMPORARY MEMORY AREA OF LOW RESOLUTION CONTENT DATA:
- CONTENT21 — 801C
- CONTENT22 — 802C
- CONTENT23 — 803C
- CONTENT24 — 804C
- CONTENT25 — 805C
- CONTENT26 — 806C
- CONTENT27 — 807C
- CONTENT28 — 808C
- CONTENT29 — 809C
- CONTENT30 — 810C
- CONTENT31 — 811C
- CONTENT32 — 812C
- CONTENT33 — 813C
- CONTENT34 — 814C
- CONTENT35 — 815C
- CONTENT36 — 816C
- CONTENT37 — 817C
- CONTENT38 — 818C
- CONTENT39 — 819C
- CONTENT40 — 820C
- CONTENT41 — 821C
- CONTENT42 — 822C
- CONTENT43 — 823C
- CONTENT44 — 824C

TEMPORARY MEMORY AREA OF MIDDLE RESOLUTION CONTENT DATA:
- 825C
- 826C
- 827C
- 828C

TEMPORARY MEMORY AREA OF HIGH RESOLUTION CONTENT DATA:
- 829C
- 830C
- 831C

F I G. 12A
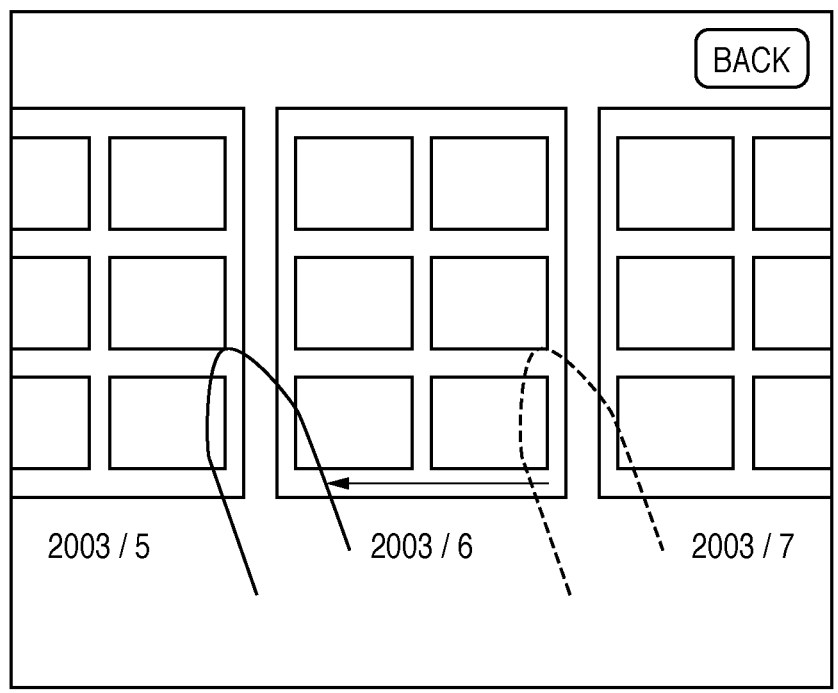
F I G. 12B
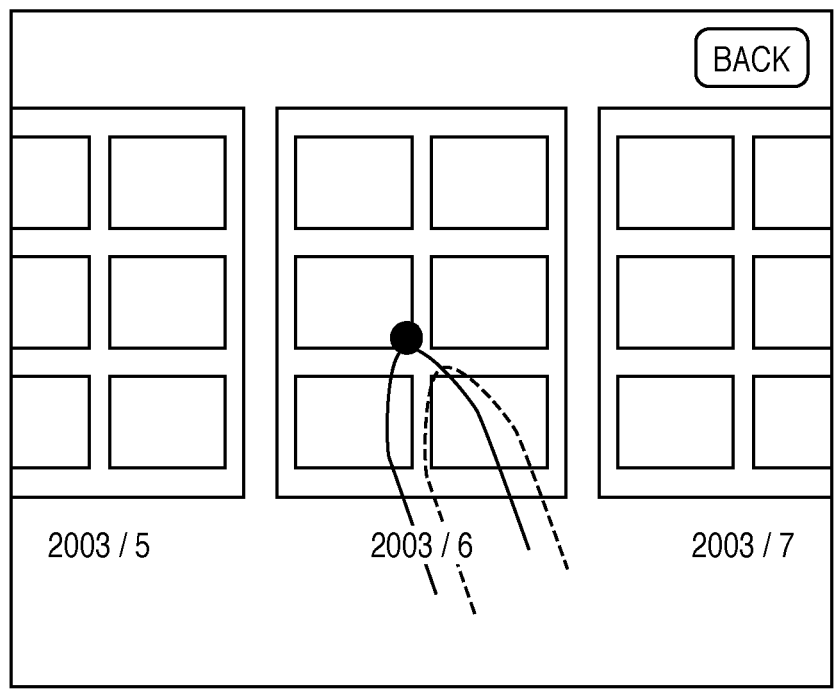

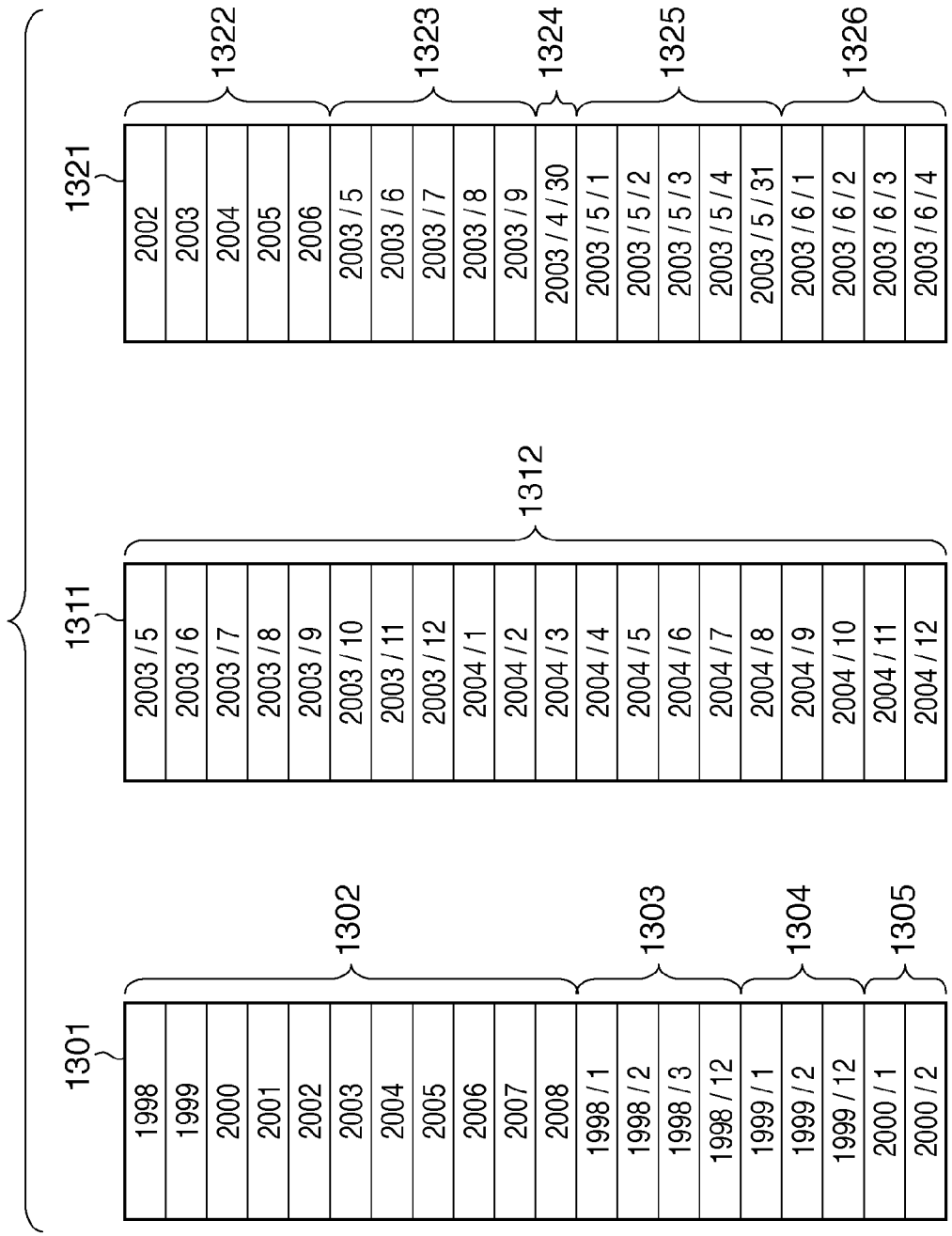

INFORMATION PROCESSING SYSTEM, INFORMATION PROCESSING APPARATUS, DISPLAY PROCESSING METHOD THEREFOR, AND COMPUTER-READABLE STORAGE MEDIUM

BACKGROUND OF THE INVENTION

1. Field of the Invention

The present invention relates to an information processing system, information processing apparatus, display processing method therefor, and computer-readable storage medium.

2. Description of the Related Art

Recently, digital video contents such as images and video managed by users are increasing dramatically. A highly interactive user interface (to be referred to as a UI) with a quick response is required to smoothly browse an enormous amount of digital video contents.

Such a UI is provided using read-ahead caching. For example, Japanese Patent Laid-Open No. 2003-101969 discloses a method of predicting the next operation, performing read-ahead caching, and switching the display immediately after the operation. In Japanese Patent Laid-Open No. 2008-26986, while the same operation continues, contents hit for a search condition decided by an operation are read ahead preferentially. This enables high-speed display switching (e.g., high-speed scrolling).

In addition to read-ahead caching, there is proposed a technique of changing the data amount in accordance with an operation and display form. For example, according to Japanese Patent Laid-Open No. 2000-232595, if readout of data delays upon page feed in list display, the information amount is decreased to read out and display data. This method improves followability to a user operation. Japanese Patent Laid-Open No. 11-146326 proposes a method of improving followability to a user operation by using a thumbnail image prepared in advance in a high-speed search mode.

However, in Japanese Patent Laid-Open Nos. 2003-101969 and 2008-26986, caching can be performed only under limited conditions in an environment where hardware resources such as the cache memory capacity and arithmetic processing speed are limited. For example, read-ahead processing can perform read-ahead of data in one direction based on a single type of operation recognized to continue. However, this processing considers only read-ahead of data in one direction. In addition, read-ahead is done only during a stop.

For this reason, caching cannot be done for certain types of search conditions (search conditions which cannot be cached), failing to achieve a cache hit rate which satisfies a user. According to Japanese Patent Laid-Open No. 2000-232595, the user cannot stop an operation on a content he wants. Further, the method in Japanese Patent Laid-Open No. 11-146326 does not give a sufficient degree of freedom in deciding content data. Even if cache control is used, this method cannot achieve a cache hit rate which satisfies a user.

As described above, it is a challenge to increase the cache hit rate with respect to a user operation and provide a UI highly interactive with a user.

SUMMARY OF THE INVENTION

The present invention provides a technique for implementing a highly interactive user interface with a quick response.

According to a first aspect of the present invention there is provided an information processing system comprising: a display control unit configured to generate a display screen based on content data temporarily stored in a temporary memory unit and display the display screen on a display device; a storage unit configured to store a plurality of content data having different display qualities for each content; a detection unit configured to detect a user operation to instruct switching of a content displayed on the display screen; a determination unit configured to determine a switching speed of content display on the display screen based on the user operation detected by the detection unit; a decision unit configured to decide a distribution for content data of each display quality to be read out to the temporary memory unit based on the switching speed determined by the determination unit; and a temporary memory control unit configured to read out the content data from the storage unit to the temporary memory unit in accordance with the distribution decided by the decision unit.

According to a second aspect of the present invention there is provided an information processing apparatus comprising: a temporary memory unit configured to temporarily store one of a plurality of content data having different display qualities for each content; a display control unit configured to generate a display screen based on content data read out to the temporary memory unit and display the display screen on a display device; a detection unit configured to detect a user operation to instruct switching of a content displayed on the display screen; a determination unit configured to determine a switching speed of content display on the display screen based on the user operation detected by the detection unit; a decision unit configured to decide a distribution for content data of each display quality to be read out to the temporary memory unit based on the switching speed determined by the determination unit; and a temporary memory control unit configured to read out content data out of the plurality of content data to the temporary memory unit in accordance with the distribution decided by the decision unit.

According to a third aspect of the present invention there is provided a display processing method for an information processing apparatus including a temporary memory unit which temporarily stores one of a plurality of content data having different display qualities for each content, the method comprising: generating a display screen based on content data read out to the temporary memory unit to display the display screen on a display device; detecting a user operation to instruct switching of a content displayed on the display screen; determining a switching speed of content display on the display screen based on the user operation detected in the detecting step; deciding a distribution for content data of each display quality to be read out to the temporary memory unit based on the switching speed determined in the determining step; and reading out content data out of the plurality of content data to the temporary memory unit in accordance with the distribution decided in the deciding step.

According to a fourth aspect of the present invention there is provided a computer-readable storage medium storing a computer program for causing a computer to function as a temporary memory unit configured to temporarily store one of a plurality of content data having different display qualities for each content, a display control unit configured to generate a display screen based on content data read out to the temporary memory unit and display the display screen on a display device, a detection unit configured to detect a user operation to instruct switching of a content displayed on the display screen, a determination unit configured to determine a switching speed of content display on the display screen based on the user operation detected by the detection unit, a decision unit configured to decide a distribution for content data of each display quality to be read out to the temporary memory unit based on the switching speed determined by the determination unit, and a temporary memory control unit configured to read out content data out of the plurality of content data to the temporary memory unit in accordance with the distribution decided by the decision unit.

Further features of the present invention will be apparent from the following description of exemplary embodiments with reference to the attached drawings.

BRIEF DESCRIPTION OF THE DRAWINGS

FIGS. 6A and 6B are a view exemplifying a data structure in a temporary memory unit 105 shown in FIG. 1;

FIGS. 7A and 7B are a view exemplifying a data structure in the temporary memory unit 105 shown in FIG. 1;

FIGS. 8A and 8B are a view exemplifying a data structure in a temporary memory unit 105 according to the second embodiment;

FIGS. 12A and 12B are views exemplifying an outline of an operation procedure in an information processing apparatus 1 according to the fourth embodiment;

FIG. 13 is a view exemplifying a data structure in a temporary memory unit 105 according to the fourth embodiment;

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
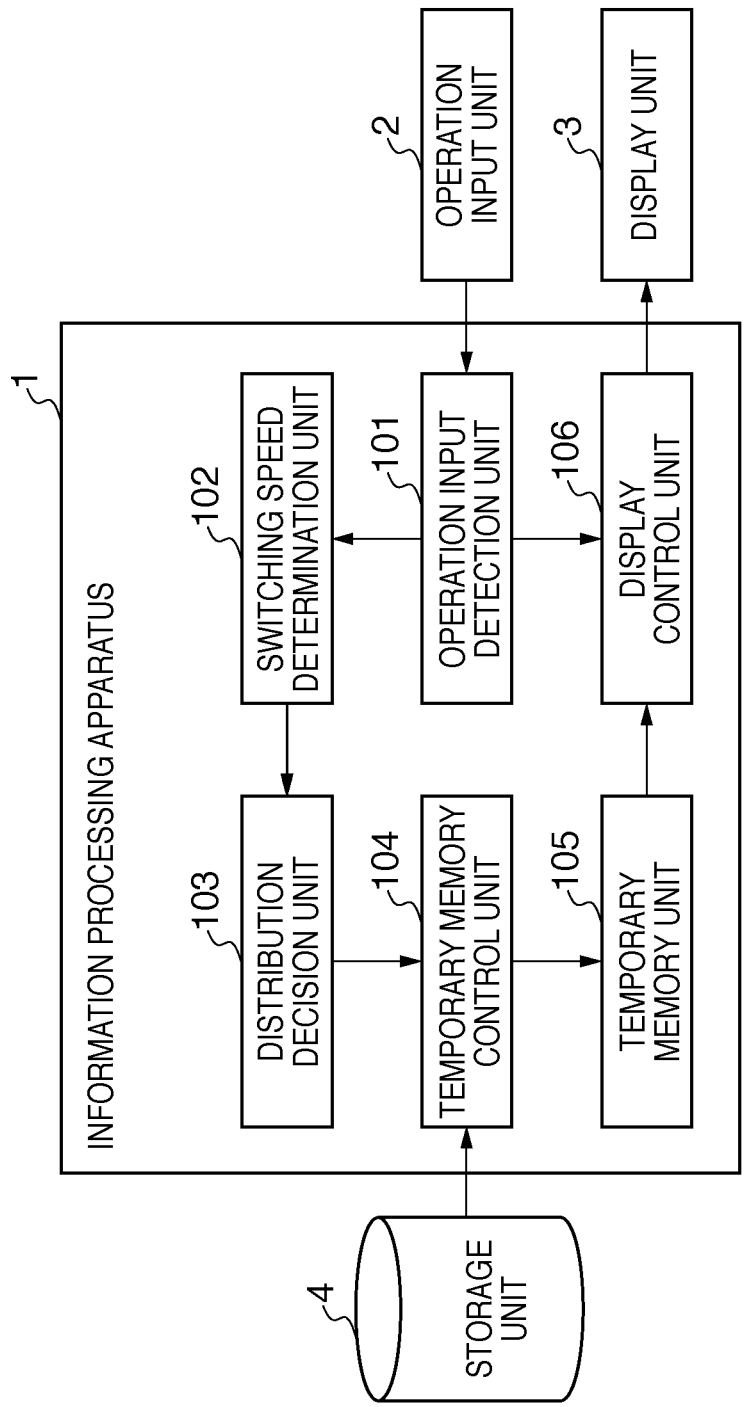
FIG. 1 is a block diagram exemplifying the functional configuration of an information processing system according to an embodiment of the present invention.

FIG. 1 is a block diagram exemplifying the functional configuration of an information processing system according to the first embodiment of the present invention.

The information processing system includes building units 1 to 5.

Reference numeral 1 denotes an information processing apparatus. The operation input unit 2 is operated by a user. The operation input unit 2 may be formed from input buttons and the like incorporated in the information processing apparatus 1 or an input device (e.g., a remote control) arranged outside the information processing apparatus 1.

The display unit (display device) 3 is typified by a display, television broadcast receiver/display, or the like. Similar to the operation input unit 2, the display unit 3 may be incorporated in the information processing apparatus 1 or provided separately.

The storage unit 4 stores content data (digital data widely including text, music, image, and video). The storage unit 4 stores a plurality of content data having different qualities for each content. Similar to the operation input unit 2, the storage unit 4 may be incorporated in the information processing apparatus 1 or provided separately.

The information processing apparatus 1 includes building units 101 to 106. The operation input detection unit 101 detects a user operation via the operation input unit 2. The switching speed determination unit 102 determines the switching speed (speed to switch the display of contents) of content display on the display unit 3. The determination of the switching speed is based on an operation (e.g., content display switching operation) detected by the operation input detection unit 101. For example, the switching speed determination unit 102 obtains the number of contents newly displayed per unit time based on a detected operation, and determines the content display switching speed based on the number of contents. Alternatively, the switching speed determination unit 102 obtains the content display time based on a detected operation, and determines the content display switching speed based on the display time.

The temporary memory unit 105 corresponds to a cache for temporarily storing content data. The distribution decision unit 103 decides on a distribution for the display quality of content data to be read out to the temporary memory unit 105. The decision of the distribution is based on a switching speed determined by the switching speed determination unit 102. Assume that the content display switching speed is high and content data having a high quality, low quality, and middle quality between them are set for each content. In this case, the distribution decision unit 103 decides on, for example, high quality: 1, middle quality: 4, and low quality: 5 as content data readout distributions, thereby reducing the readout distribution of high quality content data, which puts a burden on processing such as rendering.

The display control unit 106 generates a display screen and outputs the generated display screen to the display unit 3 to display it. The display control unit 106 reads out content data stored in the temporary memory unit 105 and generates a display screen based on the content data.

The functional configuration of the information processing system has been exemplified. The information processing apparatus 1 incorporates, for example, a computer. The computer includes a main controller such as a CPU, and storage units such as a ROM (Read Only Memory), RAM (Random Access Memory), and HDD (Hard Disk Drive). These building units are connected by a bus or the like. Various operations to be described later are controlled by executing programs stored in the storage units by the main controller.

Figure 2:
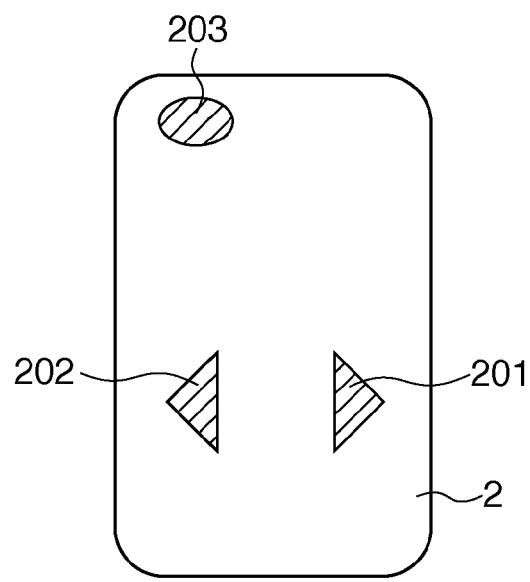
FIG. 2 is a view exemplifying an operation input unit 2 in the information processing apparatus 1 shown in FIG. 1.

FIG. 2 is a view exemplifying the operation input unit 2 in the information processing apparatus 1 shown in FIG. 1.

Operation input buttons 201 and 202 shown in FIG. 2 are right and left buttons which can designate switching of content display. A power button 203 can designate the end of processing and the like. The user presses the power button 203 to instruct, for example, the information processing apparatus 1 to start up and end.

Figure 3:
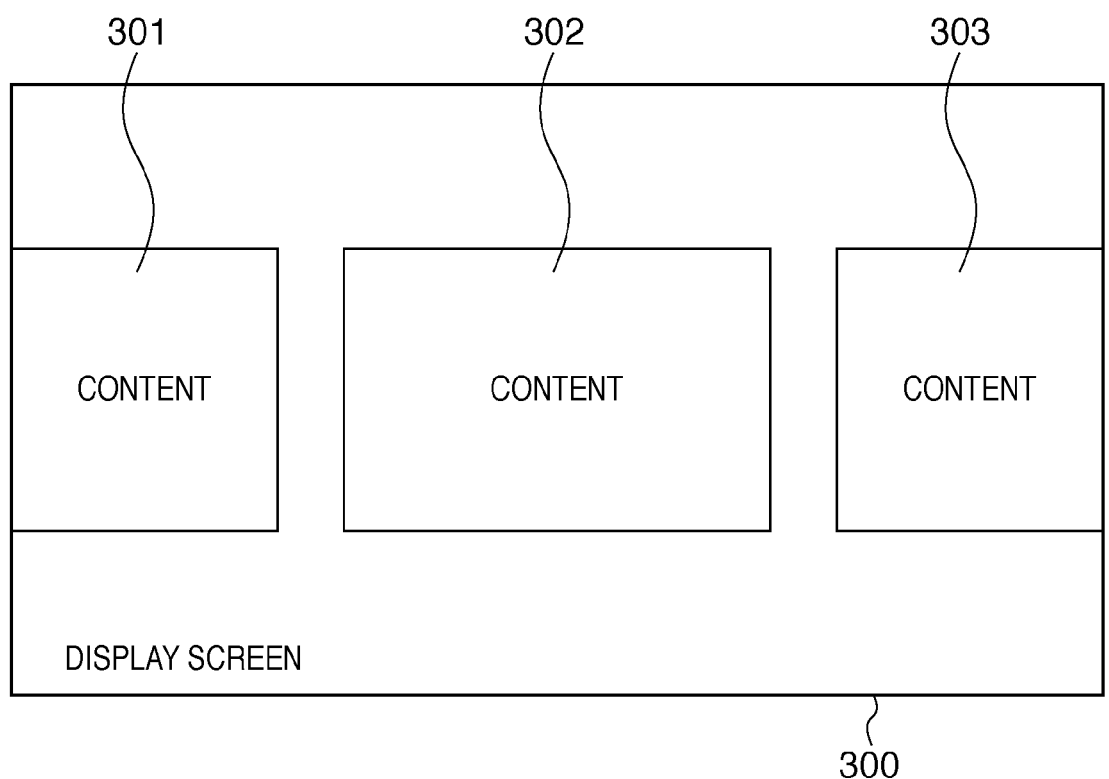
FIG. 3 is a view exemplifying a screen displayed on a display unit 3 in the information processing apparatus 1 shown in FIG. 1.

FIG. 3 is a view exemplifying a screen displayed on the display unit 3 in the information processing apparatus 1 shown in FIG. 1. The display unit 3 displays a display screen 300. Display contents 301 to 303 are displayed based on content data. The display of the contents 301 to 303 on the display screen 300 is switched in response to pressing of the operation input buttons (right and left buttons) 201 and 202.

Figure 4:
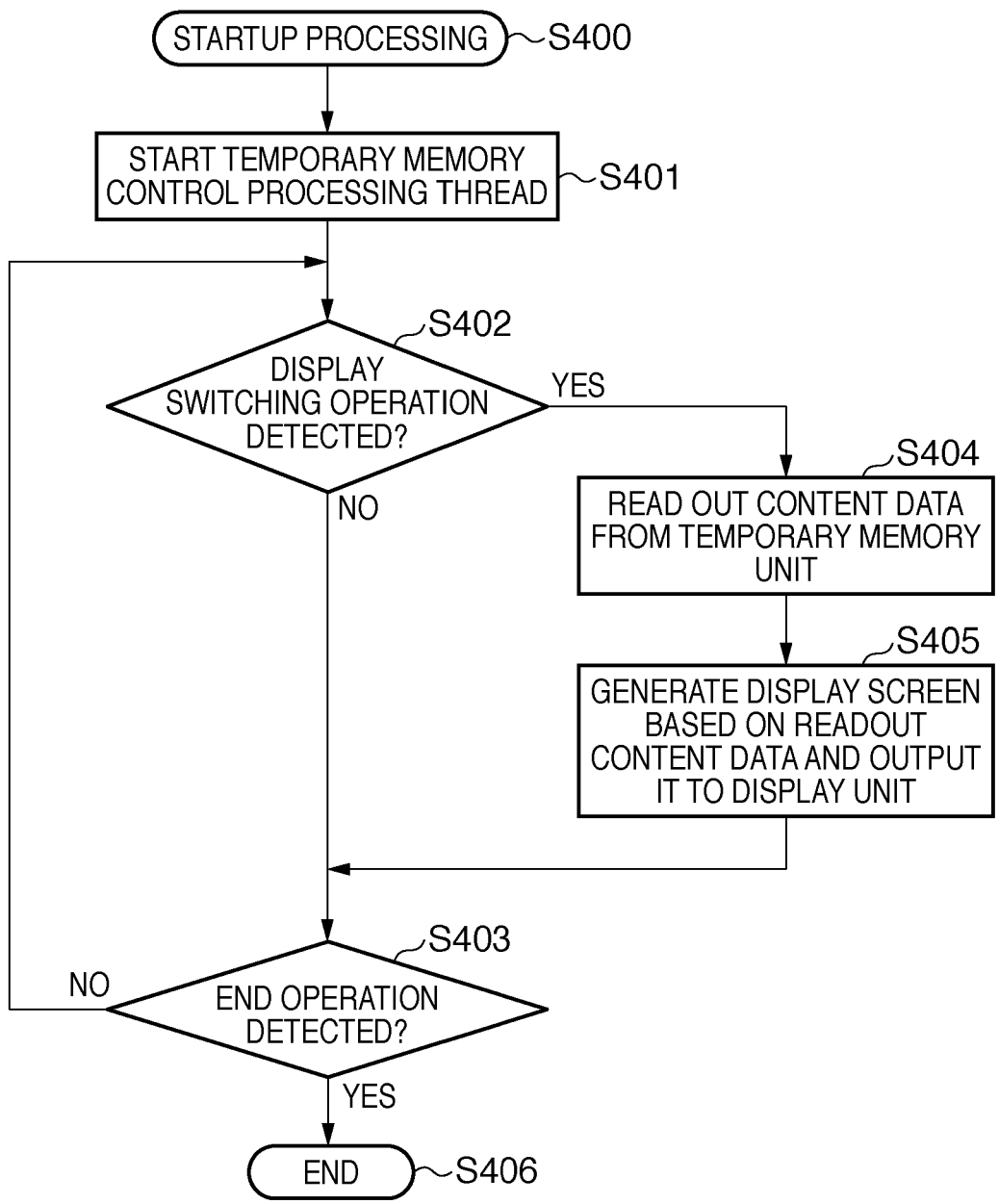
FIG. 4 is a flowchart exemplifying the sequence of startup processing in the information processing apparatus 1 shown in FIG. 1.

FIG. 4 is a flowchart exemplifying the sequence of startup processing in the information processing apparatus 1 shown in FIG. 1.

When the user presses the power button 203, the processing starts. After the start of the processing, the information processing apparatus 1 starts a temporary memory control processing thread (S401). Upon startup, the information processing apparatus 1 reads out the latest contents and contents browsed before previous end processing from the storage unit 4 sequentially in an arbitrarily determined order, and stores them in the temporary memory unit 105. Upon startup, the information processing apparatus 1 has time enough to render content data, so the readout distribution of high quality content data is set high.

The information processing apparatus 1 waits until the operation input detection unit 101 detects a content display switching operation or end operation (NO in S402 and then NO in S403). The content display switching operation and end operation are detected based on a user instruction via the operation input unit 2. If the operation input detection unit 101 detects the content display switching operation (YES in S402), the information processing apparatus 1 causes the display control unit 106 to read out content data from the temporary memory unit 105 (S404). The display control unit 106 generates a display screen from the readout content data and outputs the generated display screen to the display unit 3 to display it (S405).

If the operation input detection unit 101 detects the end operation (e.g., the user has pressed the power button) (NO in S402 and then YES in S403), the information processing apparatus 1 performs end processing. As a result, the startup processing ends (S406).

The sequence of the startup processing has been exemplified. Note that detection of the content display switching operation need not always be based on a user instruction. For example, after the user presses the power button 203, the processes in steps S404 and S405 may be performed to display a content list screen. Also, detection of the end operation need not always be based on a user instruction. For example, after the end of startup processing, end processing may be executed automatically. In this case, the end processing is not end processing of the information processing apparatus 1 but the end of startup processing.

Figure 6B:
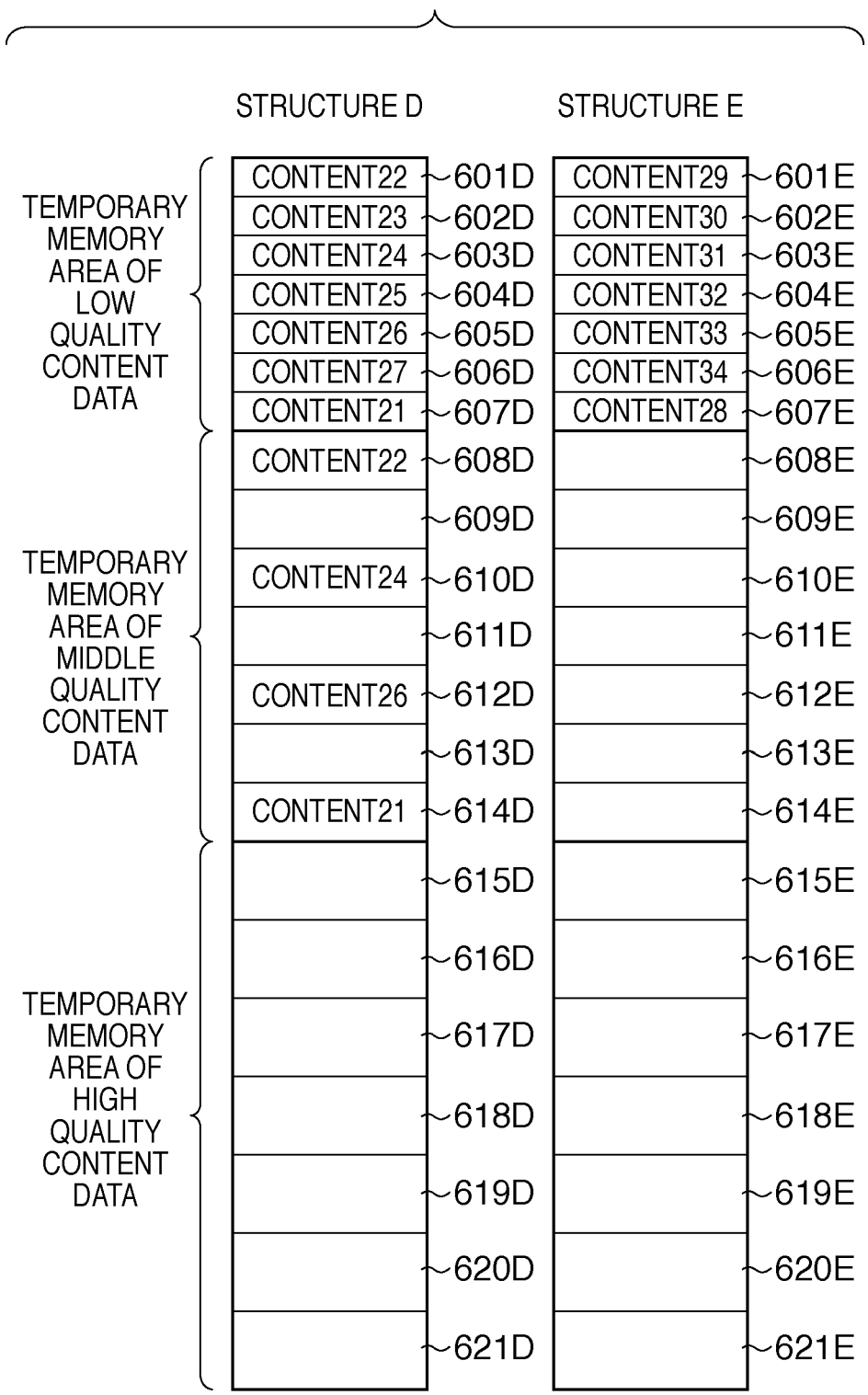

FIGS. 6A and 6B are a view exemplifying a data structure in the temporary memory unit 105 shown in FIG. 1. A structure (structure A) of content data in the temporary memory unit 105 immediately after startup processing will be explained. Other structures B to E will be described later.

Reference numerals 601A to 621A represent a concept of the memory map of the temporary memory unit 105 for storing content data. The areas 601A to 607A store low quality content data, the areas 608A to 614A store middle quality content data, and the areas 615A to 621A store high quality content data. Upon startup, priority is given to the image quality, and content data of all qualities including high quality content data are read out and stored in the temporary memory unit 105, as described above. At this time, the display control unit 106 has time enough to render content data because the display screen stands still. Thus, the display control unit 106 generates a display screen based on high quality content data. For example, the display control unit 106 generates a display screen based on high quality contents 1 to 3 stored in the areas 615A to 617A. High quality content data means, for example, high resolution content data or low compression rate content data. High quality content data may also be content data having a large color space, that is, many bits to represent color tone. To the contrary, low quality content data means content data having a low resolution, high compression rate, or small color space. Middle quality content data means all content data having an image quality (at least one of the resolution, compression rate, and color space) lower than that of high quality content data but higher than that of low quality content data.

Figure 5:
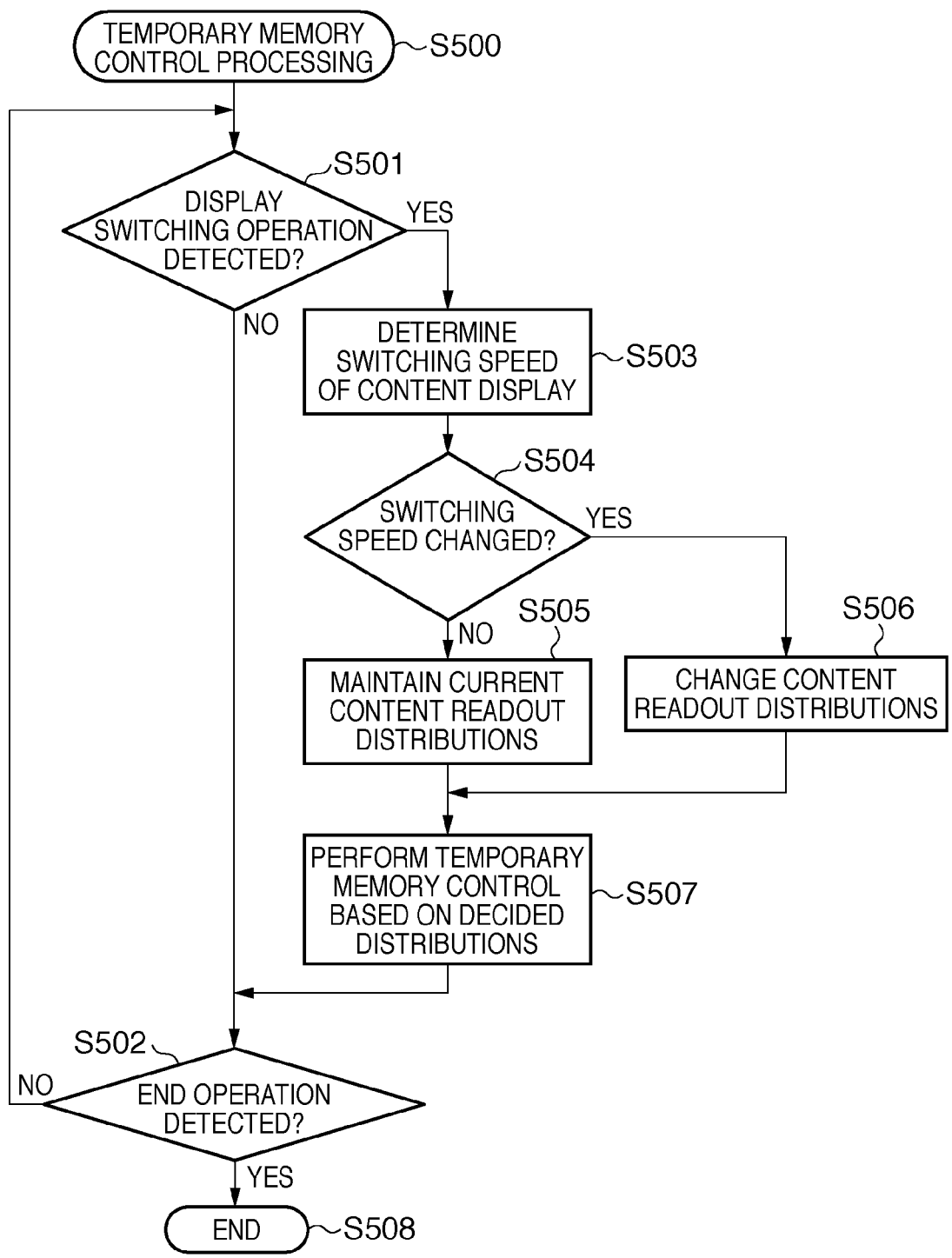
FIG. 5 is a flowchart exemplifying the sequence of temporary memory control processing in the information processing apparatus 1 shown in FIG. 1.

FIG. 5 is a flowchart exemplifying the sequence of temporary memory control processing in the information processing apparatus 1 shown in FIG. 1. This processing starts after the end of startup processing shown in FIG. 4.

After the temporary memory control processing starts (S500), the information processing apparatus 1 waits until the operation input detection unit 101 detects a content display switching operation or end operation (NO in S501 and then NO in S502). If the operation input detection unit 101 detects that the user has pressed the right or left button 201 or 202 of the operation input unit 2, that is, the content data display switching operation (YES in S501), the information processing apparatus 1 causes the switching speed determination unit 102 to determine the content display switching speed (S503). The content display switching speed is obtained based on the operation count of the right button 201 per unit time, the number of contents displayed (newly) per unit time that is determined by the time during which the right button 201 is kept pressed, the content display time, or the like.

If the switching speed determination unit 102 determines that the content display switching speed differs from the previous one (YES in S504), the information processing apparatus 1 causes the distribution decision unit 103 to change the distribution of content data for each quality. More specifically, when the press count of the right button 201 per unit time increases (i.e., the browsing content change frequency is high), the distribution decision unit 103 decreases the readout distribution of high quality content data and increases those of middle and low quality content data. In contrast, when the press count of the right button 201 per unit time decreases (i.e., the browsing content change frequency is low), the distribution decision unit 103 increases the readout distribution of high quality content data and decreases those of middle and low quality content data (S506). If the switching speed determination unit 102 determines in step S504 that the content display switching speed has not changed from the previous one (NO in S504), the information processing apparatus 1 maintains the current readout distributions (S505).

After that, the information processing apparatus 1 causes the temporary memory control unit 104 to read out, from the storage unit 4, content data of each quality based on the decided readout distribution. The temporary memory control unit 104 writes the readout content data in the temporary memory unit 105 (S507).

If the operation input detection unit 101 detects an end operation (e.g., the user has pressed the power button) (NO in S501 and then YES in S502), the information processing apparatus 1 performs end processing. Accordingly, the temporary memory control processing ends (S508).

A data structure in the temporary memory unit 105 will be exemplified with reference to FIGS. 6A and 6B. As described above, the structure A is the memory map of content data stored in the temporary memory unit 105 after startup processing.

Assume that the display screen presents a display based on contents stored in the areas 615A to 617A. When the user presses the right button 201 once, the content data used to generate a display screen change to those stored in the areas 616A to 618A. Note that newly readout content data overwrite unnecessary content data out of content data stored in the temporary memory unit 105.

The structure B represents a memory map when the content display switching speed increases slightly. Since priority somewhat shifts from the image quality to the speed, the readout distribution (to the temporary memory unit 105) changes to, for example, readout of every other high quality content data. In this case, the content data used to generate a display screen change to, for example, those stored in the areas 608B, 609B, and 610B. A display screen is generated using content data other than high quality ones. Further, the display control unit 106 may generate a display screen using low quality content data in accordance with the hardware performance.

Although the burden of generating a display screen can be reduced by using low quality content data, simple use of low quality content data may not be able to provide a satisfactory quality screen display to the user. However, a natural screen display can be presented to the user without an unnatural feeling as long as the image quality is limited to a degree enough to grasp an outline of contents.

The structure C represents a memory map when the content display switching speed becomes higher than that for the structure B. In this case, the readout distribution of high quality content data is decreased, and that of middle quality content data is increased. Similarly, the structures D and E represent memory maps when the content display switching speed further increase. In the structure D, every other middle quality content data is read out. In the structure E, the readout distribution of middle quality content data is decreased in addition to that of high quality content data, and the readout distribution of low quality content data is increased.

In the above description, as the content display switching speed increases, every other content data is read out. However, the readout method is not limited to this. For example, content data may be read out at random. Additional information representing the significance of a content and the like may be added to content data to read out content data in consideration of the additional information as well.

Figure 7A:
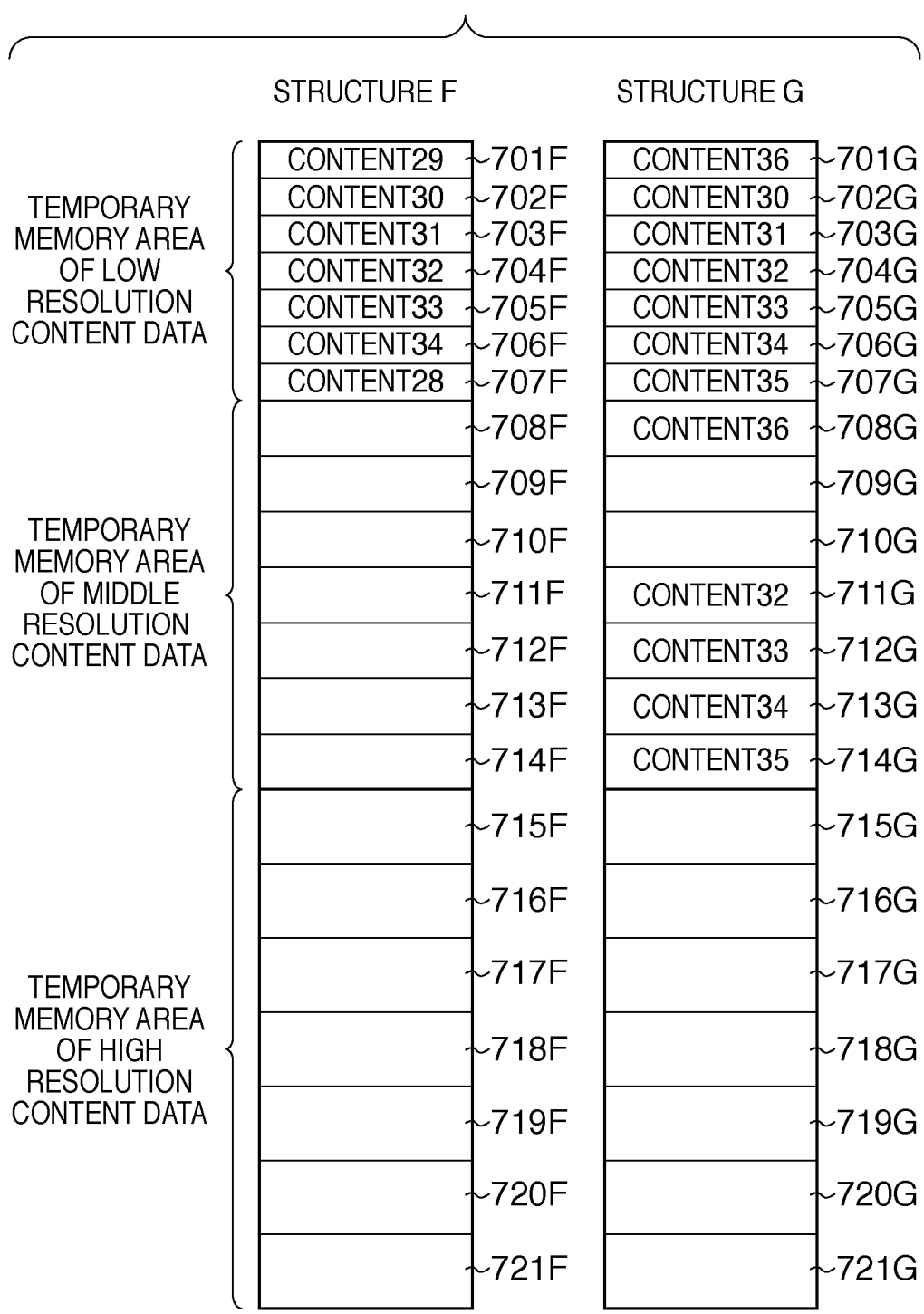

Another data structure in the temporary memory unit 105 will be exemplified with reference to FIGS. 7A and 7B. An example of a data structure at a low content display switching speed will be explained.

A structure F is identical to the structure E shown in FIG. 6B. If the content display switching speed decreases from this state, the distribution decision unit 103 increases the readout distribution of high quality content data. Structures G and H represent the memory maps of content data stored in the temporary memory unit 105 when the content display switching speed decreases gradually from that for the structure F. For example, even for contents which have already been read out, like contents 32 to 34 stored in areas 704F to 706F, content data having different qualities are read out again and stored in the temporary memory unit 105. A structure I represents the memory map of content data stored in the temporary memory unit 105 when the content display switching speed becomes much lower than those for the structures G and H. In this case, the hardware has a margin as compared to the case of a high content display switching speed. Thus, a display screen is generated using, for example, high quality content data stored in areas 720I, 721I, and 715I.

As described above, according to the first embodiment, the distribution is decided for content data of each display quality read out to the temporary memory area (cache) based on the content display switching speed. Based on the distribution, content data are read out to the temporary memory area. Even with limited hardware performance, the content display can be switched at a satisfactory speed. When the hardware performance has a margin, contents with a sufficient quality can be displayed.

Second Embodiment

The second embodiment will be described. In the first embodiment, every other content data is read out as the content display switching speed increases. In the second embodiment, content data is read out to a temporary memory unit 105 by a method different from that in the first embodiment. The arrangement and operation of an information processing apparatus 1 in the second embodiment are the same as those in the first embodiment, so a description thereof will not be repeated and a difference will be explained. The difference is the data structure of the temporary memory unit 105.

Figure 8A:
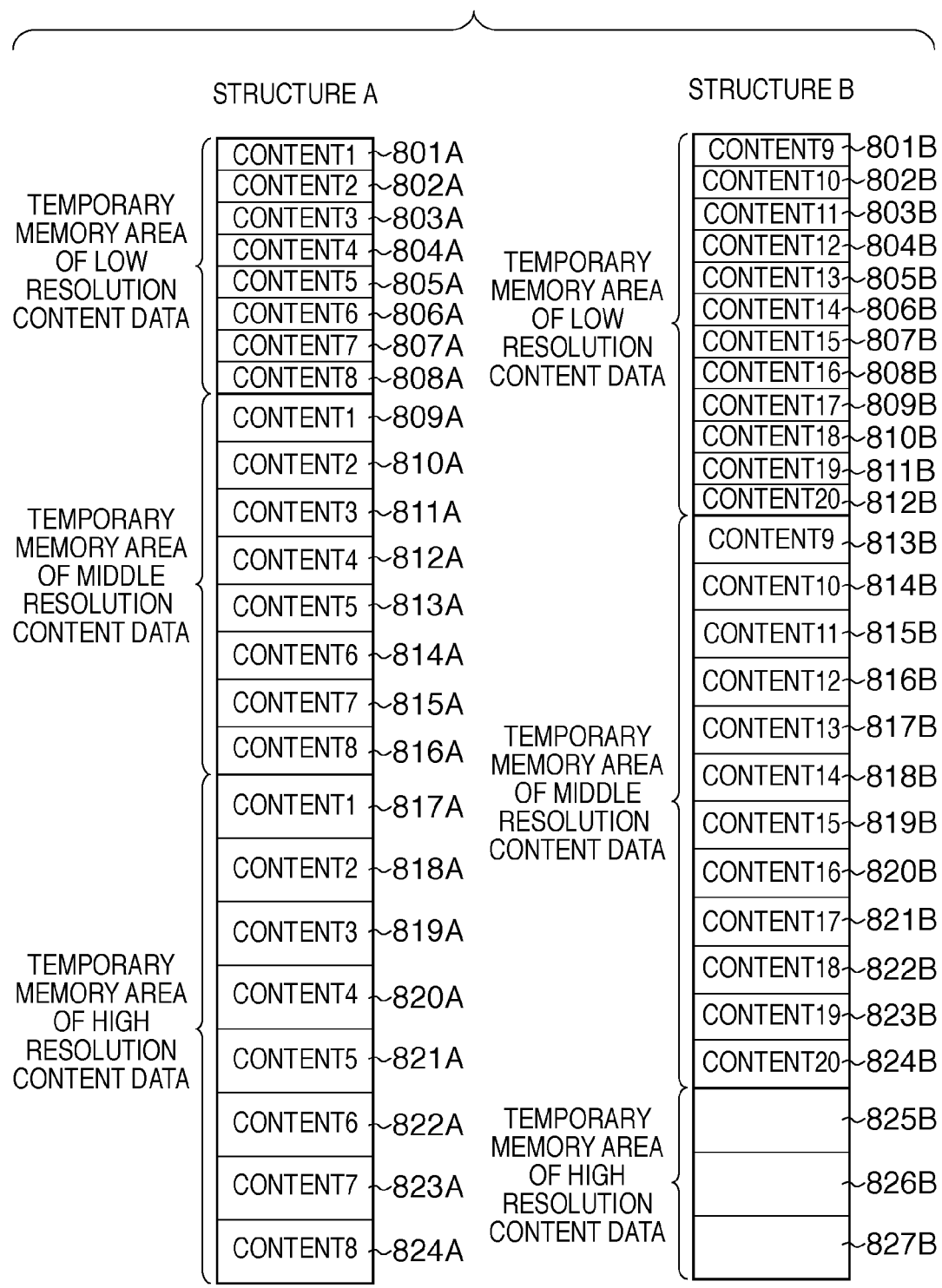

A data structure in the temporary memory unit 105 according to the second embodiment will be exemplified with reference to FIGS. 8A and 8B.

A structure A represents a data structure in the temporary memory unit 105 immediately after startup processing. Reference numerals 801A to 824A represent a concept of the memory map of the temporary memory unit 105 for storing content data. The areas 801A to 808A store low quality content data, the areas 809A to 816A store middle quality content data, and the areas 817A to 824A store high quality content data. As described in the first embodiment, upon startup, priority is given to the image quality, and content data of all qualities including high quality content data are read out and stored in the temporary memory unit 105. At this time, a display control unit 106 has time enough to render content data because the display screen stands still. Thus, the display control unit 106 generates a display screen using high quality content data. For example, the display control unit 106 generates a display screen based on high quality contents 1 to 3 stored in the areas 817A to 819A.

A structure B represents a memory map when the content display switching speed becomes slightly higher than that for the structure A. In this case, the priority of the image quality is decreased, the readout distribution of middle quality content data is increased, and that of high quality content data is decreased. The readout amount of high quality content data decreases because of the decreased readout distribution of high quality content data. Consequently, the memory area for high quality content data in the temporary memory unit 105 decreases, and that for low quality content data increases. This allows reading out a larger amount of content data to the temporary memory unit 105. Even if the content display switching speed becomes high, generation of a display screen does not delay upon a user operation.

A structure C represents a memory map when the content display switching speed becomes higher than that for the structure B. The readout distribution of low quality content data is further increased. In this case, the readout distributions of high and middle quality content data decrease, and the memory area for low quality content data increases.

As described above, according to the second embodiment, as well as the first embodiment, the content display can be switched at a satisfactory speed even with limited hardware performance. When the hardware performance has a margin, contents with a sufficient quality can be displayed.

Third Embodiment

The third embodiment will be described. The arrangement and operation of an information processing apparatus 1 in the third embodiment are the same as those in the first embodiment, so a description thereof will not be repeated and a difference will be explained. The difference is temporary memory control processing.

Figure 9:
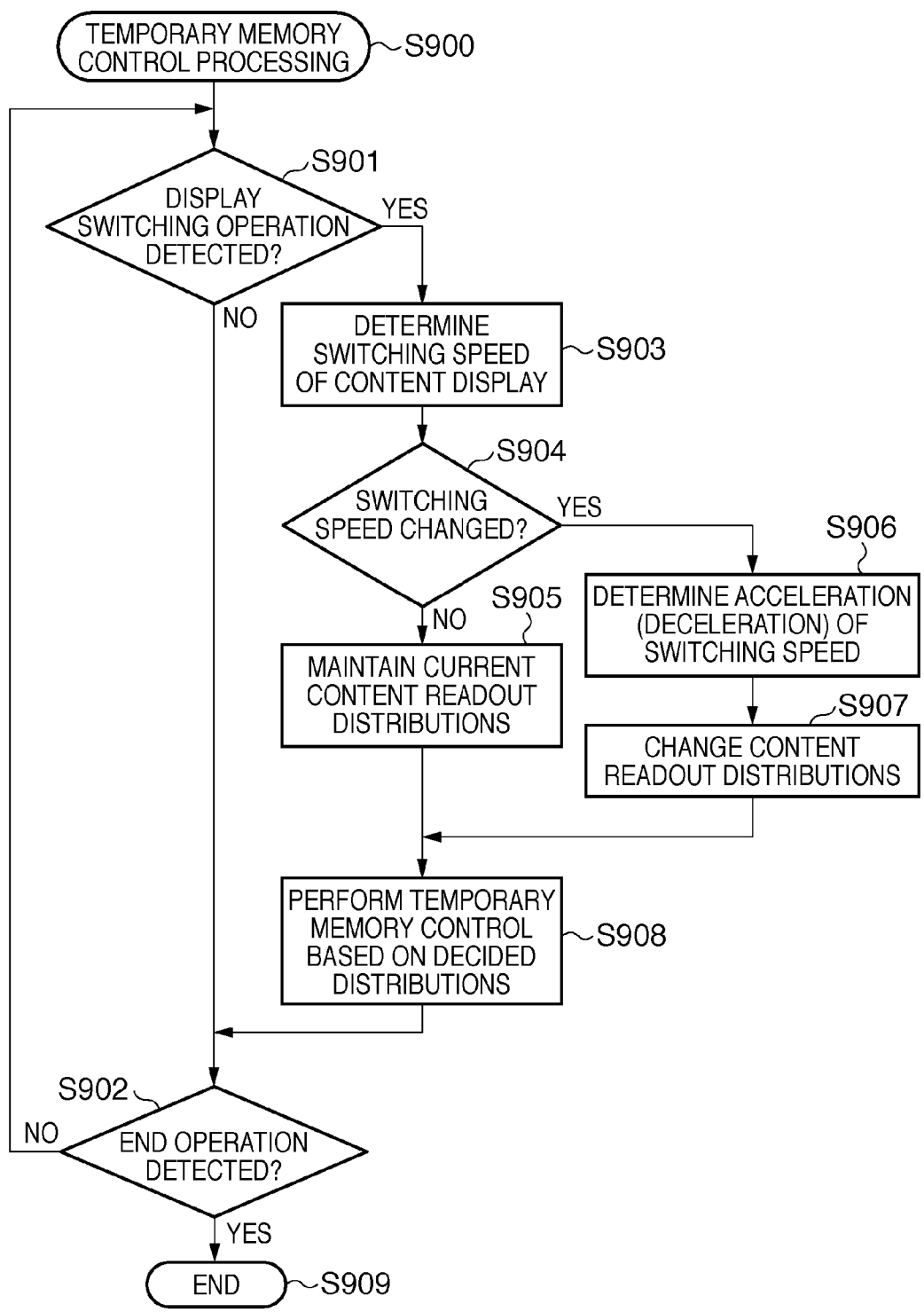
FIG. 9 is a flowchart exemplifying the sequence of temporary memory control processing according to the third embodiment.

The sequence of temporary memory control processing according to the third embodiment will be exemplified with reference to FIG. 9. This processing starts after the end of startup processing.

After the temporary memory control processing starts (S900), the information processing apparatus 1 waits until an operation input detection unit 101 detects a content display switching operation or end operation (NO in S901 and then NO in S902). If the operation input detection unit 101 detects that the user has pressed a right or left button 201 or 202 of an operation input unit 2, that is, the content data display switching operation (YES in S901), the information processing apparatus 1 causes a switching speed determination unit 102 to determine the content display switching speed (S903).

If the switching speed determination unit 102 determines that the content display switching speed differs from the previous one (YES in S904), the information processing apparatus 1 further determines the acceleration (S906). More specifically, when the press count of the right button 201 per unit time increases (i.e., the browsing content change frequency is high), the information processing apparatus 1 obtains the increase of the content switching speed per unit time and determines the acceleration. In contrast, when the press count of the right button 201 per unit time decreases (i.e., the browsing content change frequency is low), the information processing apparatus 1 obtains the decrease of the content switching speed per unit time and determines the deceleration. If the content switching speed decreases, the information processing apparatus 1 increases the readout distribution of high quality content data to a temporary memory unit 105, and decreases those of middle and low quality content data (S907). If the switching speed determination unit 102 determines in step S904 that the content display switching speed has not changed from the previous one (NO in S904), the information processing apparatus 1 maintains the current readout distributions (S905).

Then, the information processing apparatus 1 causes a temporary memory control unit 104 to read out, from a storage unit 4, content data of each quality based on the decided readout distribution. The temporary memory control unit 104 writes the readout content data in the temporary memory unit 105 (S908).

If the operation input detection unit 101 detects an end operation (e.g., the user has pressed the power button) (NO in S901 and then YES in S902), the information processing apparatus 1 performs end processing. Accordingly, the temporary memory control processing ends (S909).

As described above, according to the third embodiment, the distribution is decided for content data of each display quality read out to the temporary memory area in consideration of both the content display switching speed and its acceleration/deceleration (increase/decrease per unit time). The third embodiment can set content data readout distributions in more detail.

Fourth Embodiment

Figure 10:
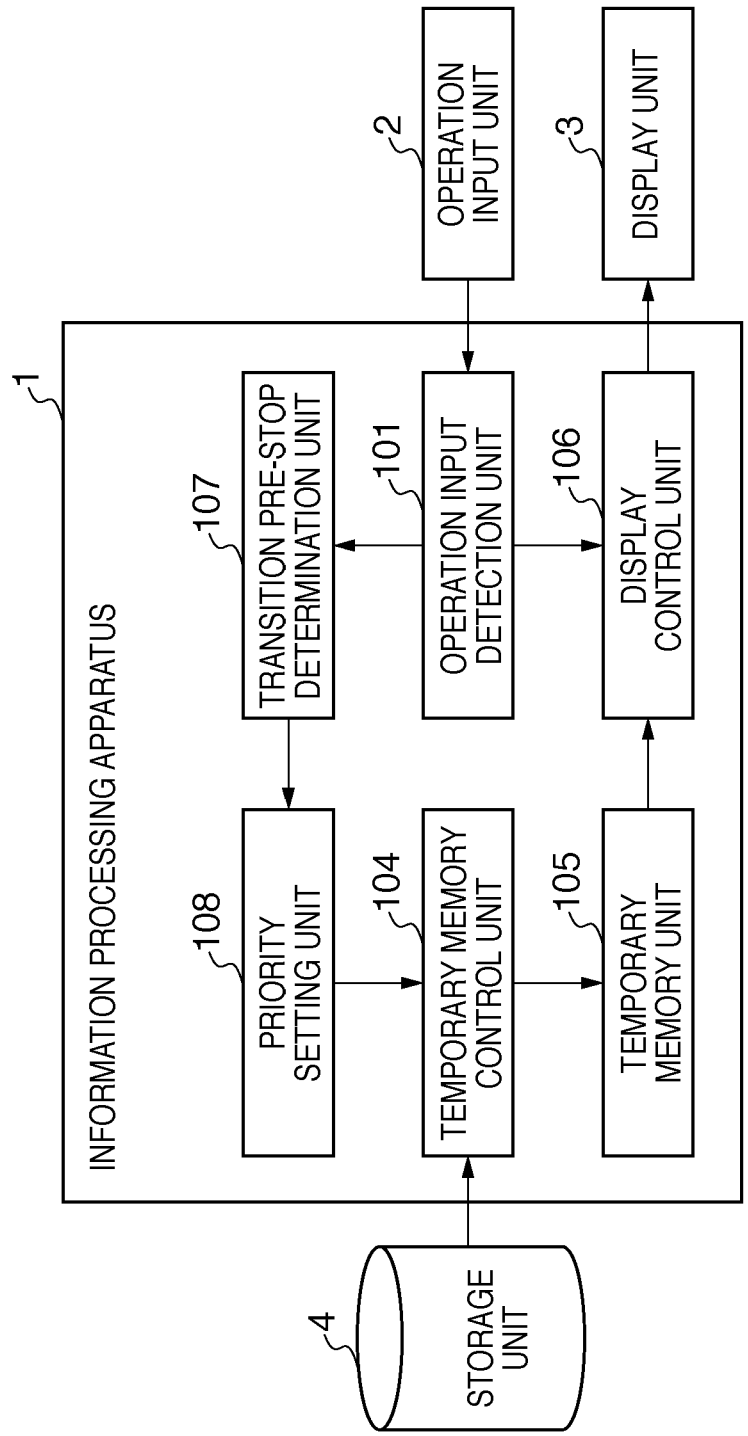
FIG. 10 is a block diagram exemplifying the functional configuration of an information processing system according to the fourth embodiment.

The Fourth embodiment will be described. FIG. 10 is a block diagram exemplifying the functional configuration of an information processing system according to the fourth embodiment. The same reference numerals as those in FIG. 1 according to the first embodiment denote the same parts.

An information processing apparatus 1 searches, for example, data stored in a storage unit 4 and displays the result on a display unit 3. The user can browse various kinds of data. In the fourth embodiment, data are searched each year, month, or day based on the shooting date & time of data.

An operation input detection unit 101 detects input of an operation (to be simply referred to as a transition instruction operation) to instruct transition of a display screen based on an operation input signal from an operation input unit 2. The transition instruction operation is, for example, a scroll operation.

Based on the detection result of the operation input detection unit 101, a transition pre-stop determination unit 107 determines a state immediately before input of the transition instruction operation stops. If the user performs the scroll operation, the transition pre-stop determination unit 107 determines that input of the transition instruction operation is just before a stop when the scroll speed decreases. An operation state when the transition pre-stop determination unit 107 determines that input of the transition instruction operation is just before a stop will be called a pre-stop state. Any other operation state will be called a pre-stop undetected state.

A priority setting unit 108 sets priority to data stored in the storage unit 4 based on the detection result of the operation input detection unit 101 and the determination result of the transition pre-stop determination unit 107. Data having high priority is highly likely to be read out to a temporary memory unit 105.

The temporary memory unit 105 is a so-called cache formed from a RAM (Random Access Memory) or the like. Read/write of data from/in the temporary memory unit 105 can be done at a higher speed than read/write of data from/in the storage unit 4. The temporary memory unit 105 temporarily stores data in correspondence with the grouping condition and the data shooting date & time condition.

A temporary memory control unit 104 controls to read out data from the storage unit 4 to the temporary memory unit 105. This readout control is performed based on priority set by the priority setting unit 108.

A display control unit 106 generates a display screen and outputs the generated display screen to the display unit 3 to display it. The display control unit 106 generates a display screen based on data stored in the temporary memory unit 105.

The functional configuration of the information processing system has been exemplified. The functional configuration of the information processing system need not always be implemented as shown in FIG. 10, and it suffices to implement all or some of the functions in any apparatus of the system. For example, in the case of FIG. 10, the storage unit 4, operation input unit 2, and display unit 3 are arranged outside the information processing apparatus 1, but may be incorporated in the information processing apparatus 1.

Figure 11:
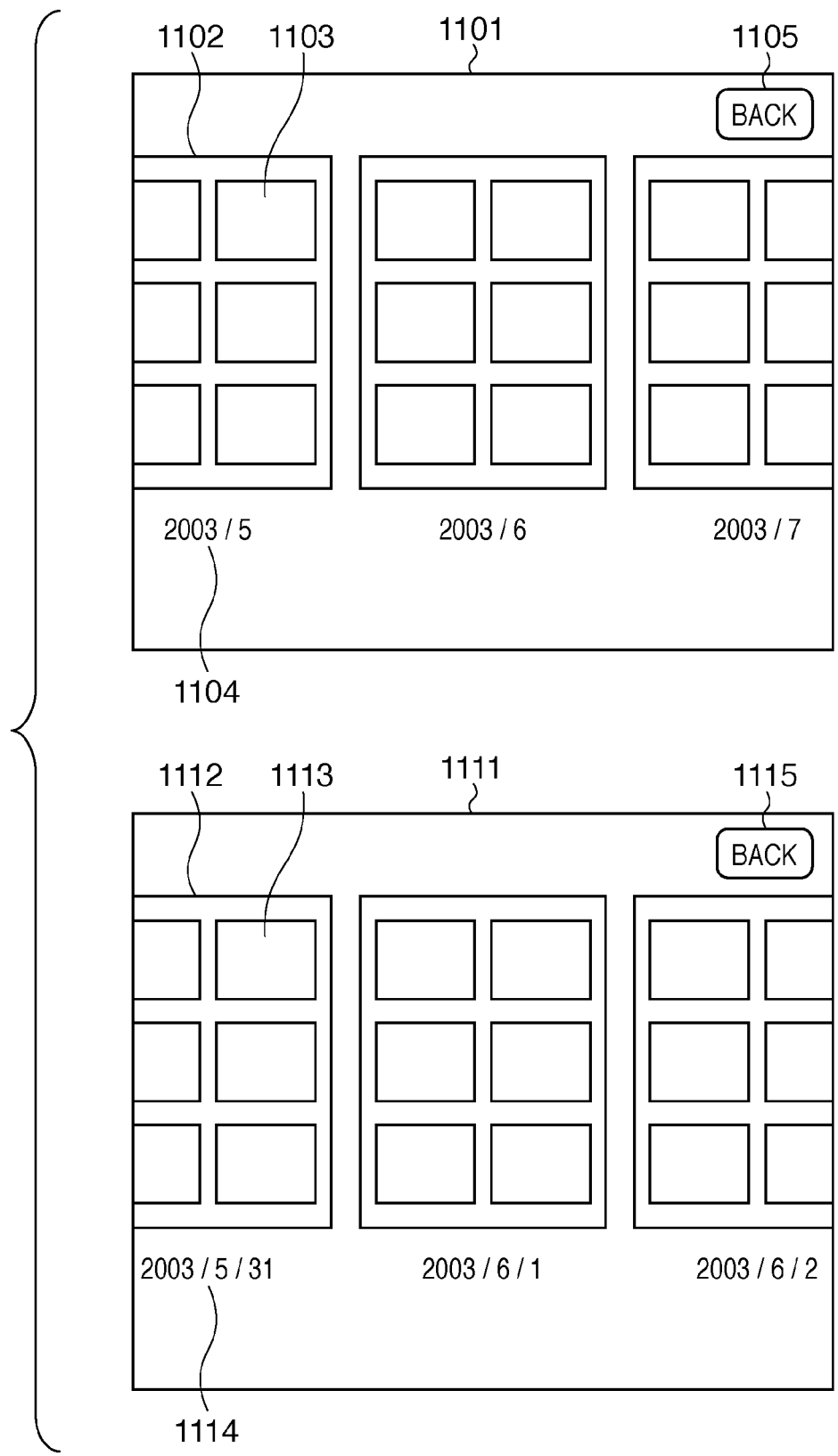
FIG. 11 is a view exemplifying a screen displayed on a display unit 3 according to the fourth embodiment.

FIG. 11 is a view exemplifying a screen displayed on the display unit 3 shown in FIG. 10. In the fourth embodiment, data to be displayed are hierarchical data. In the hierarchical data according to the fourth embodiment, data are grouped for each period based on the shooting date & time, and the data are further grouped for each year, month, and day. Year-based data are arranged at the top, and month-based data and day-based data follow in this order.

A group display screen 1101 is an example. In this case, data are grouped for each month. A group display region 1102 displays a group of data having a shooting date of 2003/5. A group thumbnail display region 1103 displays the thumbnails of data selected at random from the 2003/5 group. An attribute display region 1104 displays the attribute of each group.

A group display screen 1111 is an example. In this case, data are grouped for each day. A group display region 1112 displays a group of data having a shooting date of 2003/5/31. A group thumbnail display region 1113 displays the thumbnails of data selected at random from the 2003/5/31 group. An attribute display region 1114 displays the attribute of each group. The display screens 1101 and 1111 are merely examples, and the display screen is not limited to them.

An operation to the screen displayed on the display unit 3 will be explained. In the fourth embodiment, various user operations are input from the touch panel. Operation types are a "back operation", "scroll operation", "selection operation", and "end operation".

The "back operation" will be described with reference to FIG. 11. Buttons 1105 and 1115 are used to instruct the "back operation". If the user single-taps the button, a group superordinate to the one currently selected (i.e., displayed at the center) is displayed. For example, when the user single-taps the back button 1115 in the group display screen 1111 in which data are grouped for each day, the screen 1101 appears, in which data are grouped for each month. The "single-tap" means tapping the screen once with a finger.

The "scroll operation" and "selection operation" will be explained with reference to FIGS. 12A and 12B.

The "scroll operation" is to instruct transition of the display screen by scrolling data displayed on the display screen in a predetermined direction (which is the horizontal direction in the embodiment, but may be the vertical or oblique direction). More specifically, when the user slides his finger to the left on the screen, all the displayed groups shift (are scrolled) to the left and a new group appears from the right, as shown in FIG. 12A. Similarly, when the user slides his finger to the right, all the displayed groups shift (are scrolled) to the right and a new group appears from the left. The scroll speed changes in proportion to the speed at which the finger slides.

When the user double-taps the group display region, the "selection operation" is done as shown in FIG. 12B. In the "selection operation", a group subordinate to the currently selected one appears. For example, when the user double-taps the group display region of the 2003/6 group on the group display screen 1101 in which data are grouped for each month, the group display screen 1111 appears, in which data are grouped for each day. The "double-tap" means tapping the screen twice with a finger in a predetermined time.

FIG. 13 is a view exemplifying a data structure in the temporary memory unit 105 shown in FIG. 10. FIG. 13 shows the attribute of each group, and data necessary to display each group will be explained.

Reference numeral 1301 denotes a data structure in the temporary memory unit 105 when an initial screen is displayed. The initial screen is assumed to display data grouped for each year. In the initial screen, a group having an old shooting year or month is displayed at the center.

An area 1302 stores data for each year because data are scrolled for each year. An area 1303 stores data of groups (data of respective months in 1998) subordinate to the 1998 group (data obtained in 1998). An area 1304 stores data of groups (data of respective months in 1999) subordinate to a 1999 group (data obtained in 1999). An area 1305 stores data of groups (data of respective months in 2000) subordinate to a 2000 group (data obtained in 2000).

Reference numeral 1311 denotes a data structure in the temporary memory unit 105 when the display unit 3 displays the group display screen 1101 and the operation state at this time is the pre-stop undetected state. Data are stored for each month as represented by an area 1312 because data are scrolled for each month. In the pre-stop undetected state, the temporary memory unit 105 stores scroll data (data of the same layer).

Reference numeral 1321 denotes a data structure in the temporary memory unit 105 when the display unit 3 displays the group display screen 1101 and the operation state at this time is the pre-stop state. Reference numeral 1322 denotes data of respective years belonging to a group superordinate to data of respective months. Reference numeral 1323 denotes data of respective months used to display the group display screen 1101. Reference numeral 1324 denotes data of respective days belonging to a group subordinate to a 2003/4 group. Reference numeral 1325 denotes data of respective days belonging to a group subordinate to a 2003/5 group. Reference numeral 1326 denotes data of respective days belonging to a group subordinate to a 2003/6 group. When the temporary memory unit 105 determines that transition of the display screen is just before a stop, the ratio of scroll data (data of the same layer) decreases and that of screen switching data (data of another layer) increases. Note that data in the temporary memory unit 105 also change (e.g., are deleted or added) in accordance with an operation such as scrolling or a change of grouping.

Figure 14:
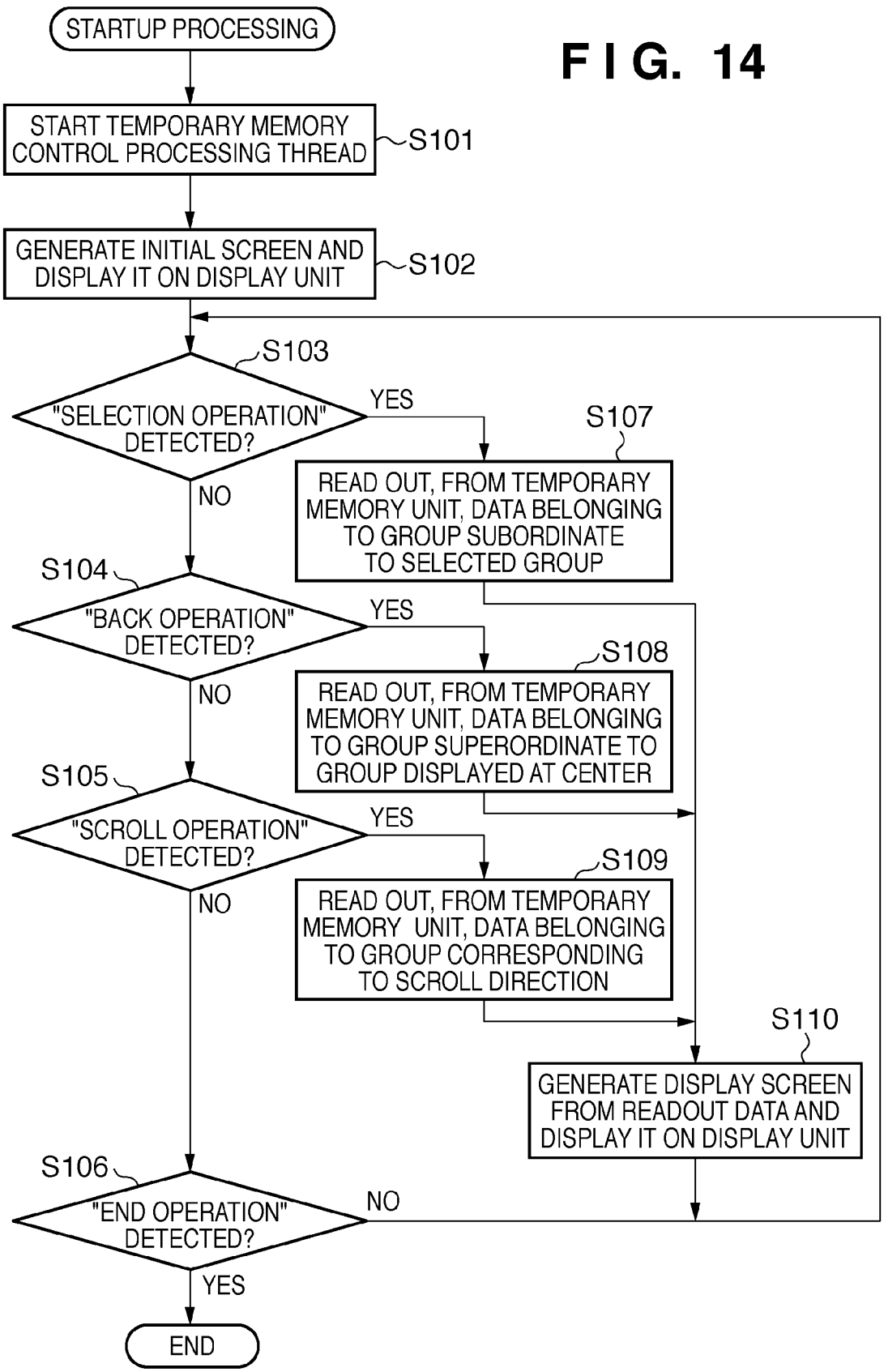
FIG. 14 is a flowchart exemplifying the sequence of startup processing in the information processing apparatus 1 according to the fourth embodiment.
Figure 15:
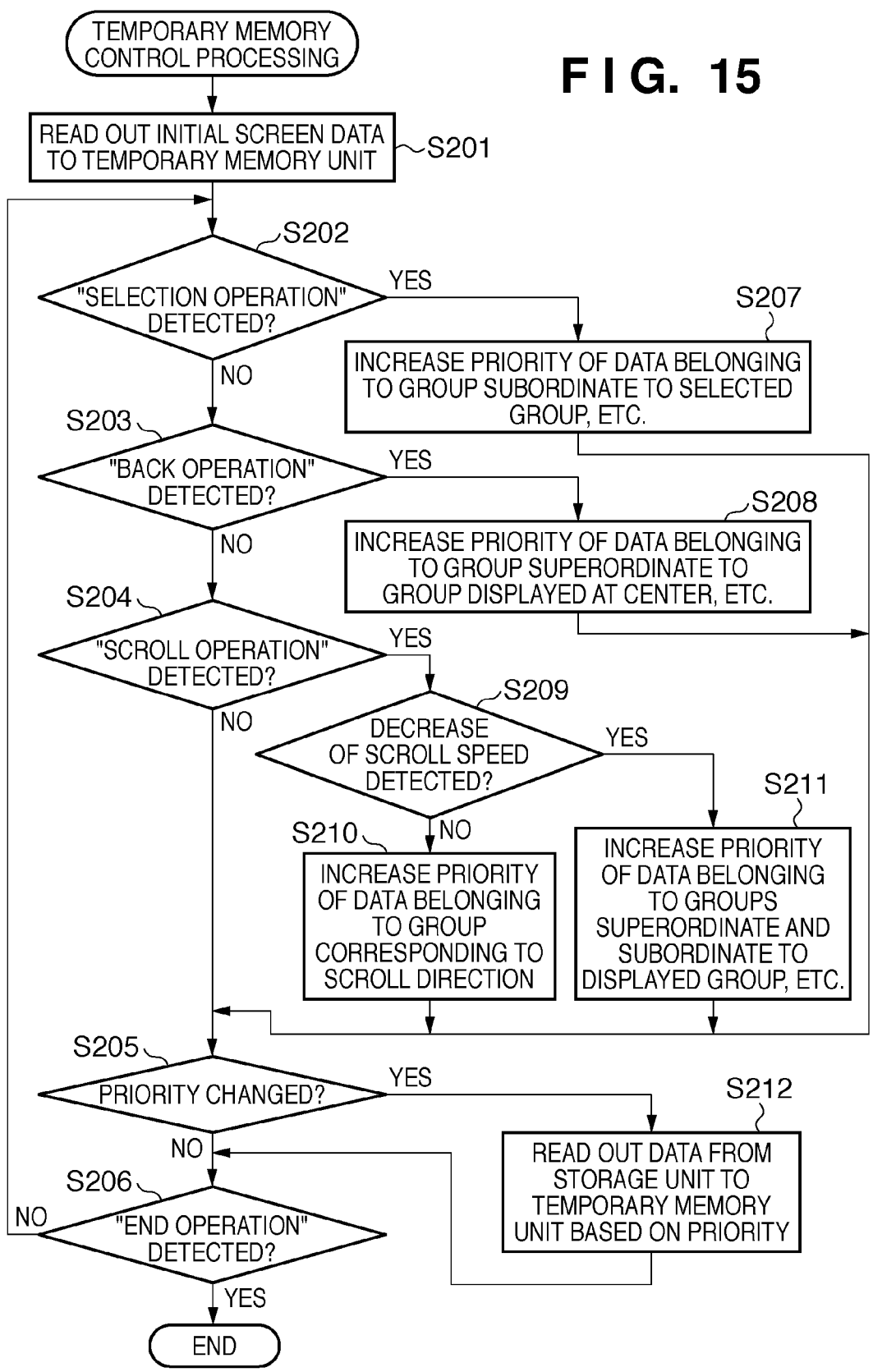
FIG. 15 is a flowchart exemplifying the sequence of temporary memory control processing in the information processing apparatus 1 according to the fourth embodiment.

An operation in the information processing apparatus 1 shown in FIG. 10 will be exemplified with reference to FIGS. 14 and 15.

FIG. 14 is a flowchart exemplifying the sequence of startup processing in the information processing apparatus 1 shown in FIG. 10.

First, the information processing apparatus 1 starts a temporary memory control processing thread (S101). More specifically, the information processing apparatus 1 reads out data from the storage unit 4 to the temporary memory unit 105. The information processing apparatus 1 causes the display control unit 106 to read out data from the temporary memory unit 105, generate an initial screen from the readout data, and output the generated display screen to the display unit 3 to display it (S102).

After displaying the screen, the information processing apparatus 1 waits until the operation input detection unit 101 detects an operation input signal from the operation input unit 2 (NOs in S103 to S106). More specifically, the information processing apparatus 1 waits until the user inputs one of the "selection operation", "back operation", "scroll operation", and "end operation".

If the operation input detection unit 101 detects the "selection operation" (YES in S103), the information processing apparatus 1 causes the display control unit 106 to read out, from the temporary memory unit 105, data belonging to a group subordinate to the one selected by the "selection operation" (S107).

If the operation input detection unit 101 detects the "back operation" (YES in S104), the information processing apparatus 1 causes the display control unit 106 to read out, from the temporary memory unit 105, data belonging to a group superordinate to the one currently selected (i.e., displayed at the center) (S108). If the operation input detection unit 101 detects the "scroll operation" (YES in S105), the information processing apparatus 1 causes the display control unit 106 to read out, from the temporary memory unit 105, data belonging to a group at a position corresponding to the scroll direction on the display screen (S109).

After the processes in S107 to S109, the information processing apparatus 1 causes the display control unit 106 to generate a display screen based on the data read out from the temporary memory unit 105, and output the generated display screen to the display unit 3 (S110). Then, the process returns to S103 again.

If the operation input detection unit 101 detects the "end operation" (YES in S106), the processing ends. If the operation input detection unit 101 does not detect the "end operation" (NO in S106), the process returns to S103 again. If the temporary memory unit 105 does not store data to be read out in the processes of S107, S108, and S109, for example, the display screen temporarily becomes blank. Alternatively, data are read out from the storage unit 4 and displayed.

FIG. 15 is a flowchart exemplifying the sequence of temporary memory control processing in the information processing apparatus 1 shown in FIG. 10.

After the processing starts, the information processing apparatus 1 causes the temporary memory control unit 104 to read out initial screen data from the storage unit 4 to the temporary memory unit 105 (S201). Then, the information processing apparatus 1 waits until the operation input detection unit 101 detects an operation input signal from the operation input unit 2 (NOs in S202 to S206). More specifically, the information processing apparatus 1 waits until the user inputs one of the "selection operation", "back operation", "scroll operation", and "end operation".

If the operation input detection unit 101 detects the "selection operation" (YES in S202), the information processing apparatus 1 causes the priority setting unit 108 to increase the priority of data belonging to a group subordinate to the one selected by the "selection operation". At this time, the priority setting unit 108 also increases the priority of data having a predetermined relevance with the subordinate group (S207). Data having a predetermined relevance means data falling within a predetermined range from data which belongs to a subordinate group and is displayed on the display screen. For example, when data on 2003/6/1 to 30 are displayed as data belonging to a subordinate group, data having a predetermined relevance are data on 2003/5/31, 2003/7/1, and the like.

If the operation input detection unit 101 detects the "back operation" (YES in S203), the information processing apparatus 1 causes the priority setting unit 108 to increase the priority of data belonging to a group superordinate to the selected one (in this case, a group displayed at the center of the screen). At this time, the priority setting unit 108 also increases the priority of data having a predetermined relevance with the superordinate group (S208). Data having a predetermined relevance with a superordinate group means data falling within a predetermined range from data which belongs to the superordinate group and is displayed on the display screen.

If the operation input detection unit 101 detects the "scroll operation" (YES in S204), the information processing apparatus 1 causes the transition pre-stop determination unit 107 to determine a state immediately before transition of the display screen stops. As described above, this processing is done by determining whether the scroll speed in the scroll direction (transition direction) has decreased. The decrease of the scroll speed is detected from, for example, the speed at which the finger slides on the screen.

If a decrease of the scroll speed is detected (YES in S209), the information processing apparatus 1 causes the priority setting unit 108 to change the priority of each data according to the method described with reference to FIG. 13. More specifically, the priority setting unit 108 increases the priority of data belonging to groups superordinate and subordinate to a displayed group, and also increases the priority of data having a predetermined relevance with the superordinate and subordinate groups (S211). As described above, data having a predetermined relevance with superordinate and subordinate groups mean data falling within a predetermined range from data which belong to the superordinate and subordinate groups and are displayed on the display screen.

If no decrease of the scroll speed is detected (NO in S209), the information processing apparatus 1 causes the priority setting unit 108 to increase the priority of data belonging to a group at a position corresponding to the scroll direction on the display screen (S210). Increasing the priority of data is to increase the priority relatively to another data or change it to a predetermined value.

If the information processing apparatus 1 detects a change of the priority after the above-mentioned process (YES in S205), it causes the temporary memory control unit 104 to read out data from the storage unit 4 based on the priority and store it in the temporary memory unit 105 (S212). If the operation input detection unit 101 detects the "end operation" (YES in S206), the processing ends. If the operation input detection unit 101 does not detect the "end operation" (NO in S206), the process returns to S202 again.

As described above, according to the fourth embodiment, a state immediately before transition of the display screen stops is determined, and data cached in the temporary memory unit 105 is changed. That is, only data necessary to display a screen to which the display screen may change is read ahead in the pre-stop state. The efficiency of memory utilization for read-ahead processing increases even immediately after transition of the display screen stops. In addition, quick data readout enables smooth screen transition.

Fifth Embodiment

The fifth embodiment will be described. A system configuration according to the fifth embodiment is the same as that in FIG. 10 according to the fourth embodiment, and a description thereof will not be repeated. A difference of the fifth embodiment from the fourth embodiment will be mainly explained.

Figure 16:
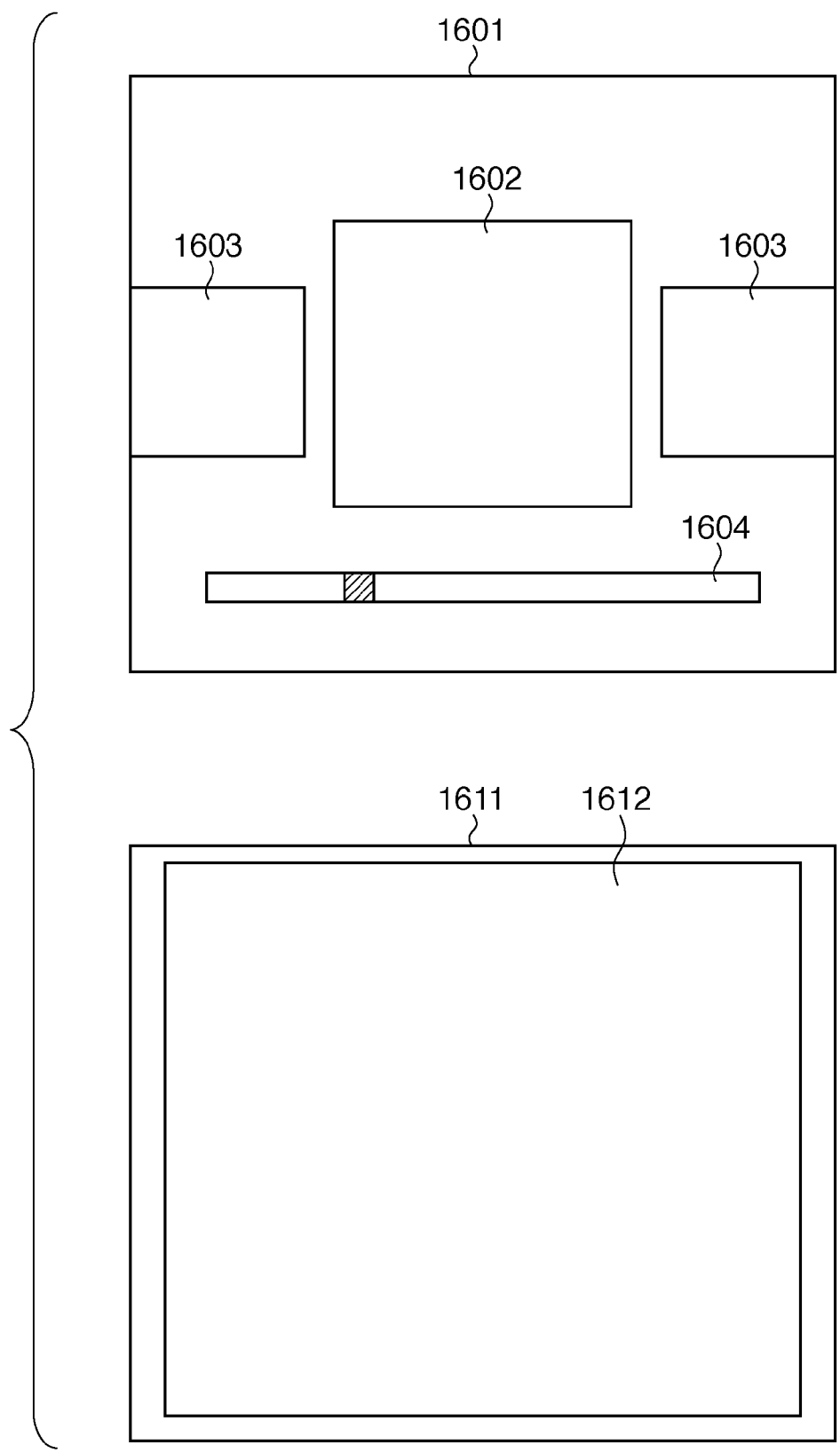
FIG. 16 is a view exemplifying a screen displayed on a display unit 3 according to the fifth embodiment.

FIG. 16 is a view exemplifying a screen displayed on a display unit 3 according to the fifth embodiment.

Reference numeral 1601 denotes a preview screen. On the preview screen 1601, data are arranged from left to right in ascending order of shooting date & time.

A focused thumbnail display region 1602 displays a selected thumbnail, that is, focused thumbnail. Each operation is done for the focused thumbnail. A thumbnail display region 1603 displays a thumbnail. An indicator 1604 indicates the position of a focused thumbnail in all data.

A full display screen 1611 displays data using the entire screen. A full screen data display region 1612 displays full screen data. The display screens 1601 and 1611 are merely examples, and the display screen is not limited to them.

Figure 17:
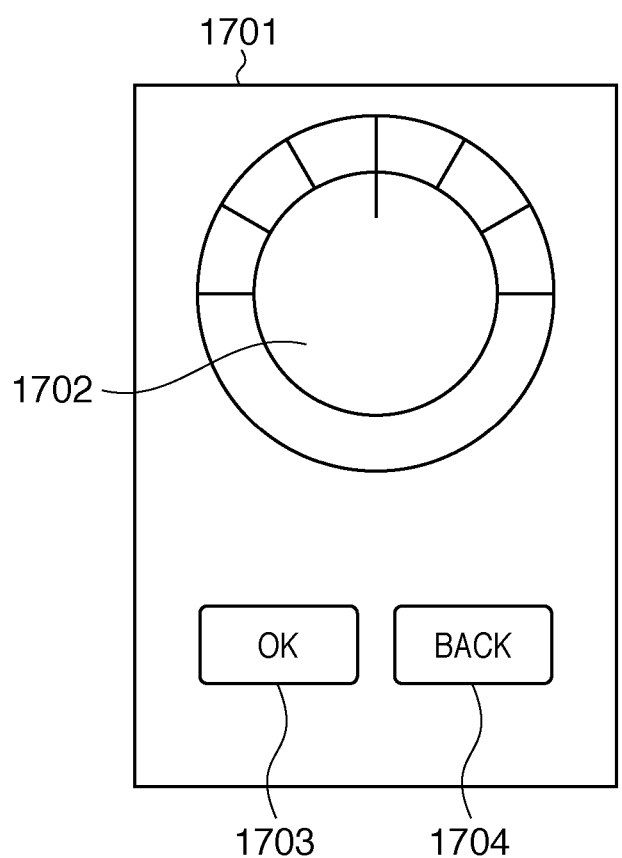
FIG. 17 is a view exemplifying the outer appearance of an operation input unit 2 according to the fifth embodiment.

FIG. 17 is a view exemplifying the outer appearance of an operation input unit 2 according to the fifth embodiment. In the fifth embodiment, the operation input unit 2 is formed not from a touch panel but from a device having a dial.

Reference numeral 1701 denotes an operation input device. The user operates a dial 1702 to give the instruction for a "jump operation" (available only on the preview screen 1601). For example, the dial 1702 can be turned right or left in three steps. After the operation, the dial 1702 automatically turns back to the original state. The "jump operation" is to give the instruction for transition of the display screen by skipping one or a plurality of data displayed on the display screen in a predetermined direction (which is the horizontal direction in the embodiment, but may be the vertical or oblique direction). For example, when the dial 1702 is turned right on the preview screen 1601, all the displayed thumbnails shift (are scrolled) to the right, and a thumbnail having an older shooting date & time appears from the left. The degree of transition of the display screen, that is, the jump distance (which changes to every data, every 10 data, or every 100 data) changes in accordance with the inclination of the dial.

The user presses an OK button 1703 to instruct a "selection operation (OK)" (available only on the preview screen 1601). For example, when the user performs the "selection operation" on the preview screen 1601, the preview screen 1601 changes to the full display screen 1611. That is, the focused thumbnail in the focused thumbnail display region 1602 is displayed on the entire screen.

The user presses a back button 1704 to instruct a "back operation" (available only on the full display screen 1611). For example, when the user performs the "back operation" on the full display screen 1611, the full display screen 1611 changes to the preview screen 1601. That is, when the user presses the back button 1704, the preview screen 1601 appears, in which the thumbnail of data displayed on the full screen is displayed at the center and the thumbnails of data relevant to the data are arranged on the right and left sides.

Figure 18:
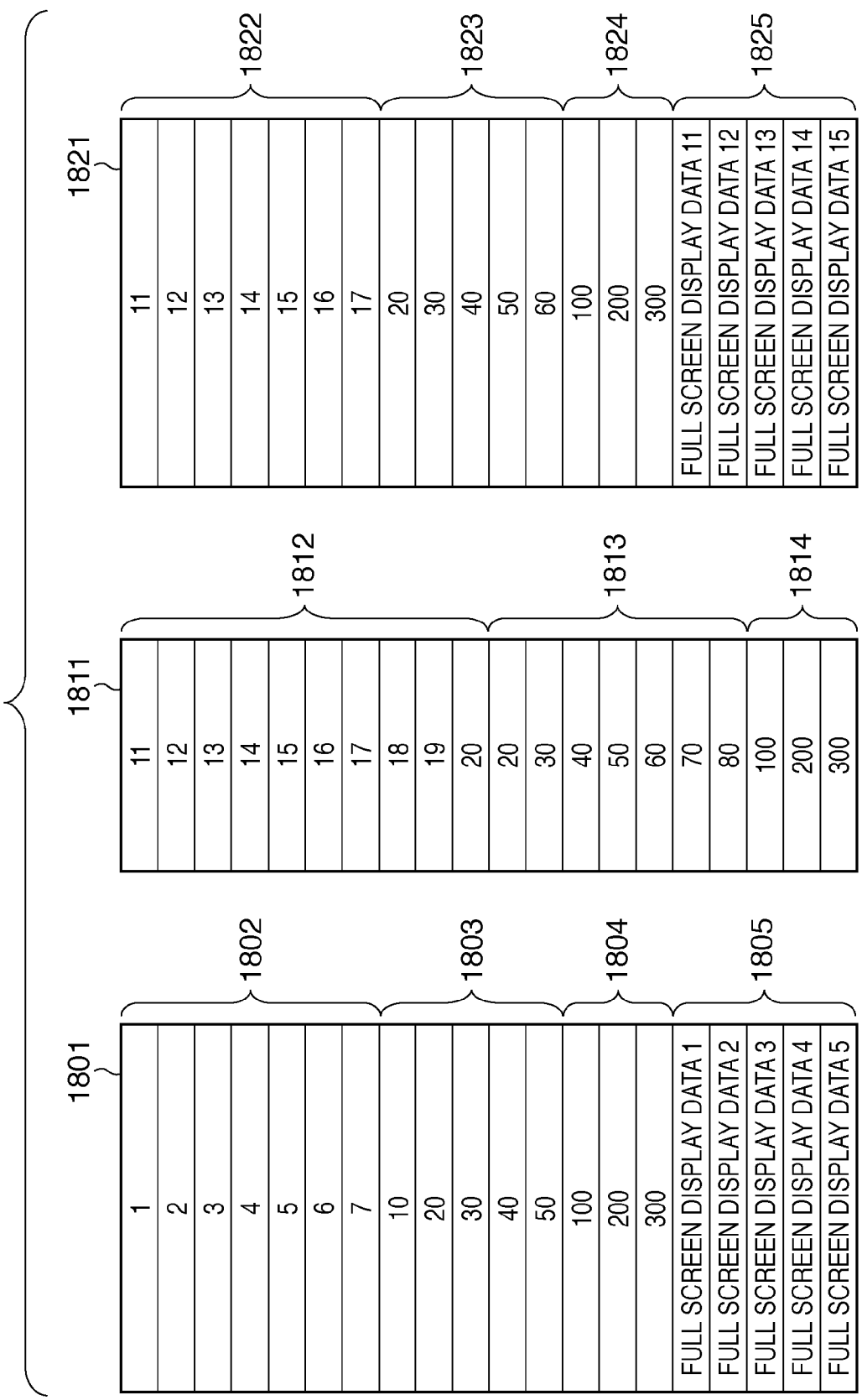
FIG. 18 is a view exemplifying a data structure in a temporary memory unit 105 according to the fifth embodiment.

FIG. 18 is a view exemplifying a data structure in a temporary memory unit 105 according to the fifth embodiment. In this example, data "1" appears at the top among sorted data, and data "2" comes next. An integer "N" is thumbnail data of the Nth data. "Full screen display data N" is full screen display data of the Nth data.

Reference numeral 1801 denotes a data structure in the temporary memory unit 105 when an initial screen is displayed. Assume that the initial screen is the preview screen 1601 shown in FIG. 16, and the thumbnail of the first data in sorting order is displayed in the focused thumbnail display region 1602.

Reference numeral 1802 denotes data for jumping one data; 1803, data for jumping 10 data; and 1804, data for jumping 100 data. The temporary memory unit 105 stores these data to cope with any "jump operation" for every one, 10, or 100 data indicated by the user.

Reference numeral 1805 denotes full screen display data. When the preview screen 1601 is displayed, the temporary memory unit 105 stores the respective jump data and the full screen display data.

Reference numeral 1811 denotes a data structure in the temporary memory unit 105 when the display unit 3 displays the preview screen 1601 and the operation state at this time is the pre-stop undetected state. Reference numeral 1812 denotes data for jumping one data; 1813, data for jumping 10 data; and 1814, data for jumping 100 data. In the pre-stop undetected state, the temporary memory unit 105 stores these jump data.

Reference numeral 1821 denotes a data structure in the temporary memory unit 105 when the display unit 3 displays the preview screen 1601 and the operation state at this time is the pre-stop state. Reference numeral 1822 denotes data for jumping one data; 1823, data for jumping 10 data; and 1824, data for jumping 100 data. Reference numeral 1825 denotes full screen display data. The temporary memory unit 105 stores the jump data and full screen display data at a ratio which changes between the pre-stop state and the pre-stop undetected state. Note that data in the temporary memory unit 105 also change (e.g., are deleted or added) in accordance with an operation such as the "jump operation".

Figure 19:
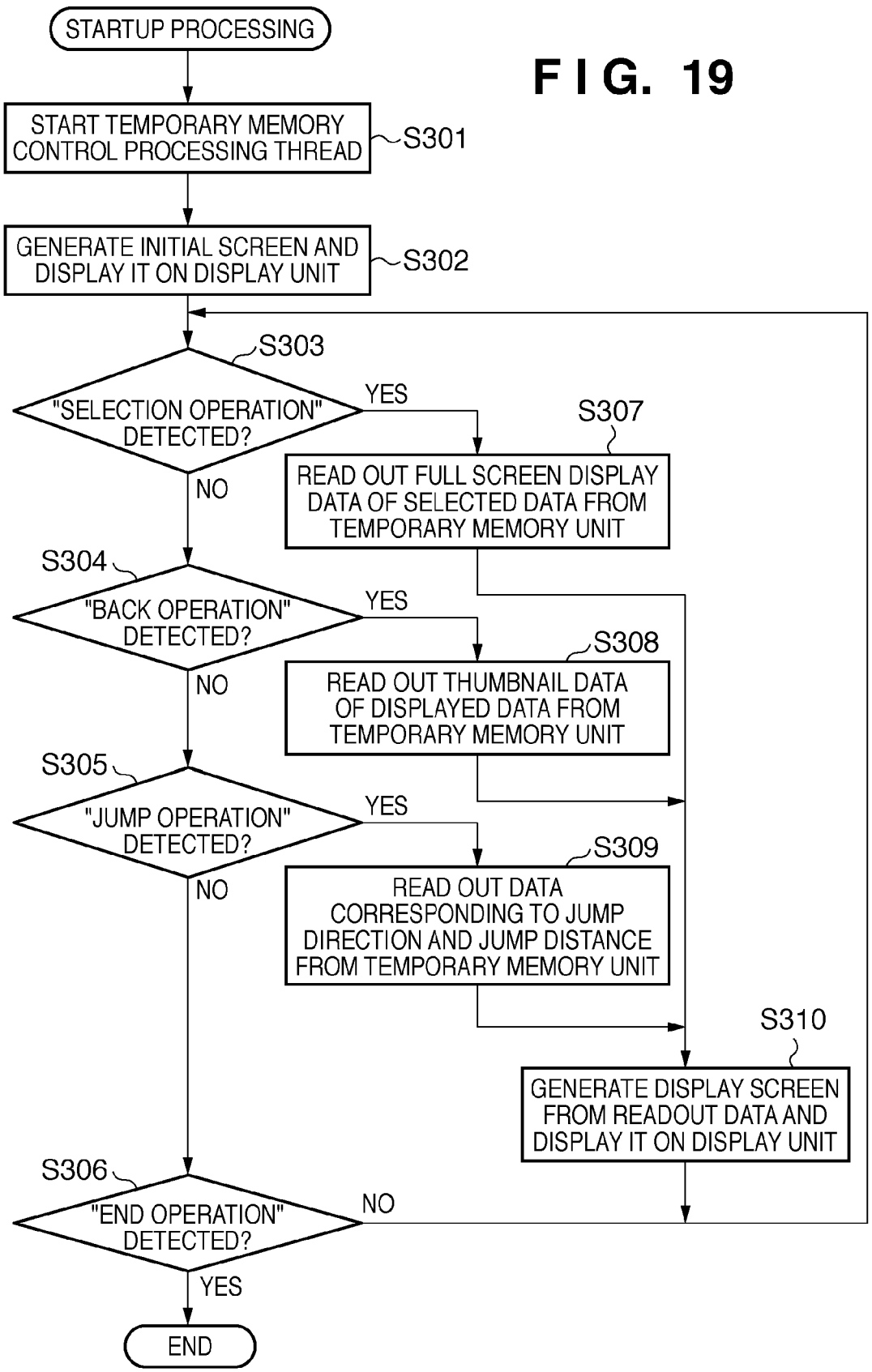
FIG. 19 is a flowchart exemplifying the sequence of startup processing in an information processing apparatus 1 according to the fifth embodiment.
Figure 20:
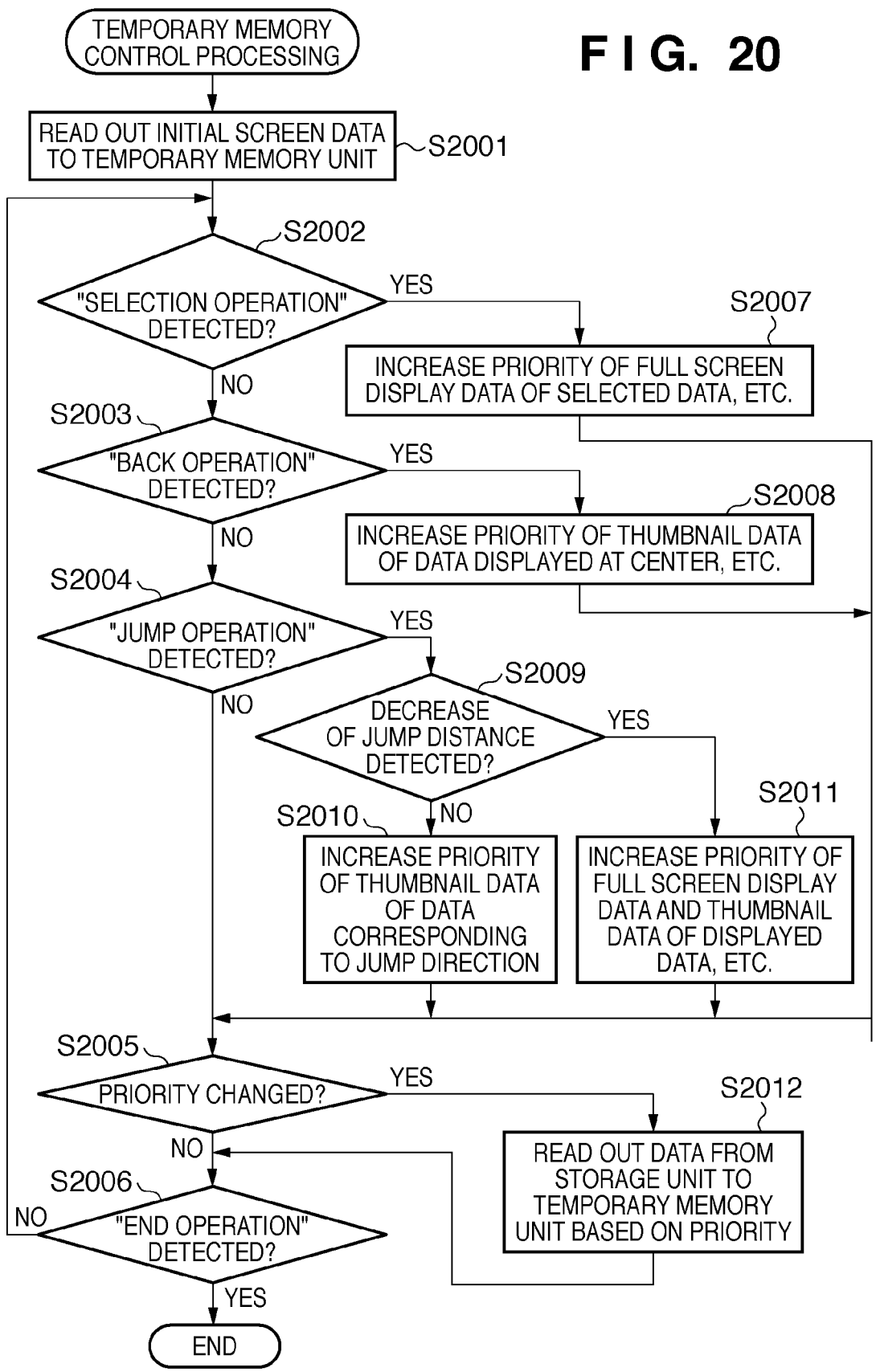
FIG. 20 is a flowchart exemplifying the sequence of temporary memory control processing in the information processing apparatus 1 according to the fifth embodiment.

An operation in an information processing apparatus 1 according to the fifth embodiment will be exemplified with reference to FIGS. 19 and 20.

FIG. 19 is a flowchart exemplifying the sequence of startup processing in the information processing apparatus 1 according to the fifth embodiment.

First, the information processing apparatus 1 starts a temporary memory control processing thread (S301). More specifically, the information processing apparatus 1 reads out data from a storage unit 4 to the temporary memory unit 105. The information processing apparatus 1 causes a display control unit 106 to read out data from the temporary memory unit 105, generate an initial screen (the preview screen 1601 in this case) from the readout data, and output the generated display screen to the display unit 3 to display it (S302).

After displaying the screen, the information processing apparatus 1 waits until an operation input detection unit 101 detects an operation input signal from the operation input unit 2 (NOs in S303 to S306). More specifically, the information processing apparatus 1 waits until the user inputs one of the "selection operation", "back operation", "jump operation", and "end operation".

If the operation input detection unit 101 detects the "selection operation" (YES in S303), the information processing apparatus 1 causes the display control unit 106 to read out, from the temporary memory unit 105, full screen display data of data selected by the "selection operation" (S307).

If the operation input detection unit 101 detects the "back operation" (YES in S304), the information processing apparatus 1 causes the display control unit 106 to read out, from the temporary memory unit 105, thumbnail data of data displayed on the full display screen 1611 (S308).

If the operation input detection unit 101 detects the "jump operation" (YES in S305), the information processing apparatus 1 causes the display control unit 106 to read out, from the temporary memory unit 105, data at a position corresponding to the jump direction and jump distance on the display screen (S309).

After the processes in S307 to S309, the information processing apparatus 1 causes the display control unit 106 to generate a display screen based on the data read out from the temporary memory unit 105, and output the generated display screen to the display unit 3 (S310). The process then returns again to S303.

If the operation input detection unit 101 detects the "end operation" (YES in S306), the processing ends. If the operation input detection unit 101 does not detect the "end operation" (NO in S306), the process returns to S303 again. If the temporary memory unit 105 does not store data to be read out in the processes of S307, S308, and S309, for example, the display screen temporarily becomes blank. Alternatively, data are read out from the storage unit 4 and displayed.

FIG. 20 is a flowchart exemplifying the sequence of temporary memory control processing in the information processing apparatus 1 according to the fifth embodiment.

After the processing starts, the information processing apparatus 1 causes a temporary memory control unit 104 to read out initial screen data from the storage unit 4 to the temporary memory unit 105 (S2001). Then, the information processing apparatus 1 waits until the operation input detection unit 101 detects an operation input signal from the operation input unit 2 (NOs in S2002 to S2006). More specifically, the information processing apparatus 1 waits until the user inputs one of the "selection operation", "back operation", "jump operation", and "end operation".

If the operation input detection unit 101 detects the "selection operation" (YES in S2002), the information processing apparatus 1 causes a priority setting unit 108 to increase the priority of full screen display data of data selected by the "selection operation". At this time, the priority setting unit 108 also increases the priority of full screen display data of data having a predetermined relevance with the selected data (S2007). Data having a predetermined relevance means data falling within a predetermined range from data displayed on the display screen. For example, when data having a shooting date of 2003/6/1 are displayed, data having a predetermined relevance are data having shooting dates of 2003/5/31, 2003/6/2, and the like.

If the operation input detection unit 101 detects the "back operation" (YES in S2003), the information processing apparatus 1 causes the priority setting unit 108 to increase the priority of thumbnail data of a selected group (in this case, a group displayed at the center of the screen). At this time, the priority setting unit 108 also increases the priority of thumbnail data of data having a predetermined relevance with the selected data (S2008). As described above, data having a predetermined relevance means data falling within a predetermined range from data displayed on the display screen.

If the operation input detection unit 101 detects the "jump operation" (YES in S2004), the information processing apparatus 1 causes a transition pre-stop determination unit 107 to determine a state immediately before transition of the display screen stops. In the fifth embodiment, this state is determined by determining whether the jump distance in the jump direction (transition direction) has decreased. The decrease of the jump distance is detected from, for example, the degree of inclination of the dial 1702.

If a decrease of the jump distance is detected (YES in S2009), the information processing apparatus 1 causes the priority setting unit 108 to change the priority of each data according to the method described with reference to FIG. 18. More specifically, the priority setting unit 108 increases the priority of full screen display data and thumbnail data of displayed data, and also increases the priority of full screen display data and thumbnail data of data having a predetermined relevance with the displayed data (S2011). As described above, data having a predetermined relevance means data falling within a predetermined range from data displayed on the display screen.

If no decrease of the jump distance is detected (NO in S2009), the information processing apparatus 1 causes the priority setting unit 108 to increase the priority of thumbnail data of data at a position corresponding to the jump direction on the display screen (S2010). Increasing the priority of data is to increase the priority relatively to another data or change it to a predetermined value.

If the information processing apparatus 1 detects a change of the priority after the above-mentioned process (YES in S2005), it causes the temporary memory control unit 104 to read out data from the storage unit 4 based on the priority and store it in the temporary memory unit 105 (S2012). If the operation input detection unit 101 detects the "end operation" (YES in S2006), the processing ends. If the operation input detection unit 101 does not detect the "end operation" (NO in S2006), the process returns to S2002 again.

As described above, the fifth embodiment can increase the efficiency of memory utilization for read-ahead processing even immediately after transition of the display screen stops as in the fourth embodiment even during a jump operation. In addition, the fifth embodiment achieves smooth screen transition.

Sixth Embodiment

The sixth embodiment will be described. The sixth embodiment will describe a case in which reversal of the scroll direction is detected to determine a state immediately before transition of the display screen stops. This is because the user often reverses the scroll direction to keep desired data at an optimum display position when stopping the scroll operation.

A system configuration according to the sixth embodiment is the same as that in FIG. 10 according to the fourth embodiment, and a description thereof will not be repeated. A difference of the sixth embodiment from the fourth embodiment will be mainly explained. In the sixth embodiment, data to be displayed are hierarchical data. For descriptive convenience, the same data as those in the fourth embodiment are used.

Figure 21:
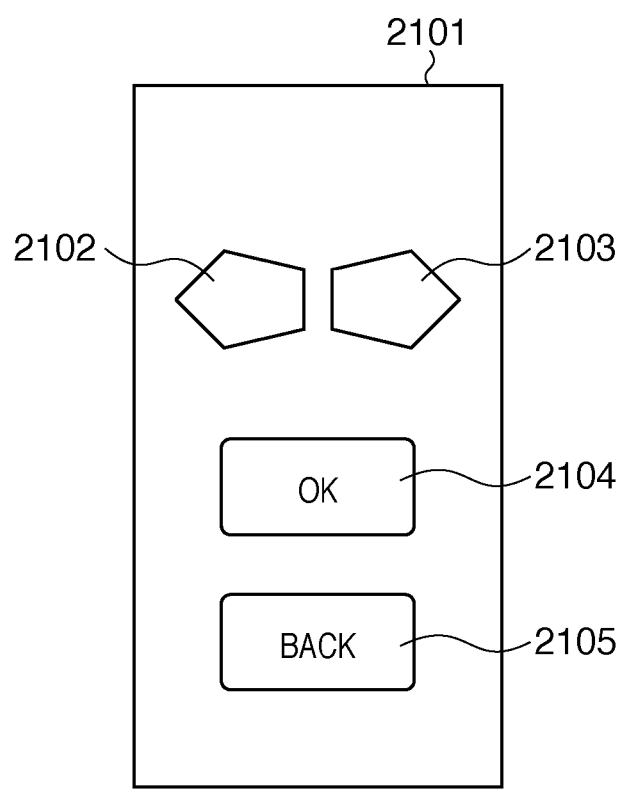
FIG. 21 is a view exemplifying the outer appearance of an operation input unit 2 according to the sixth embodiment.

FIG. 21 is a view exemplifying the outer appearance of an operation input unit 2 according to the sixth embodiment. In the sixth embodiment, the operation input unit 2 is formed not from a touch panel but from a device having buttons.

Reference numeral 2101 denotes an operation input device. The user presses a left button 2102 to instruct the "scroll operation" to the left. For example, when the user presses the left button 2102 once, all the displayed groups shift (are scrolled) to the right and a new group appears from the left.

The user presses a right button 2103 to instruct the "scroll operation" to the right. For example, when the user presses the right button 2103 once, all the displayed groups shift (are scrolled) to the left and a new group appears from the right.

The user presses an OK button 2104 to instruct the "selection operation". When the user presses the OK button 2104, the display screen changes to a group display screen 1101 to display a group subordinate to the one currently selected (i.e., displayed at the center). For example, when the user presses the OK button 2104 on the group display screen 1101 in which data are grouped for each month, a group display screen 1111 appears, in which data are grouped for each day.

The user presses a back button 2105 to instruct the "back operation". When the user presses the back button 2105, the display screen changes to the group display screen 1101 to display a group superordinate to the one currently selected (i.e., displayed at the center). For example, when the user presses the back button 2105 on the group display screen 1111 in which data are grouped for each day, the group display screen 1101 appears, in which data are grouped for each month.

An operation in an information processing apparatus 1 according to the sixth embodiment will be exemplified. Startup processing according to the sixth embodiment is the same as that in FIG. 14 according to the fourth embodiment, and a description thereof will not be repeated.

Figure 22:
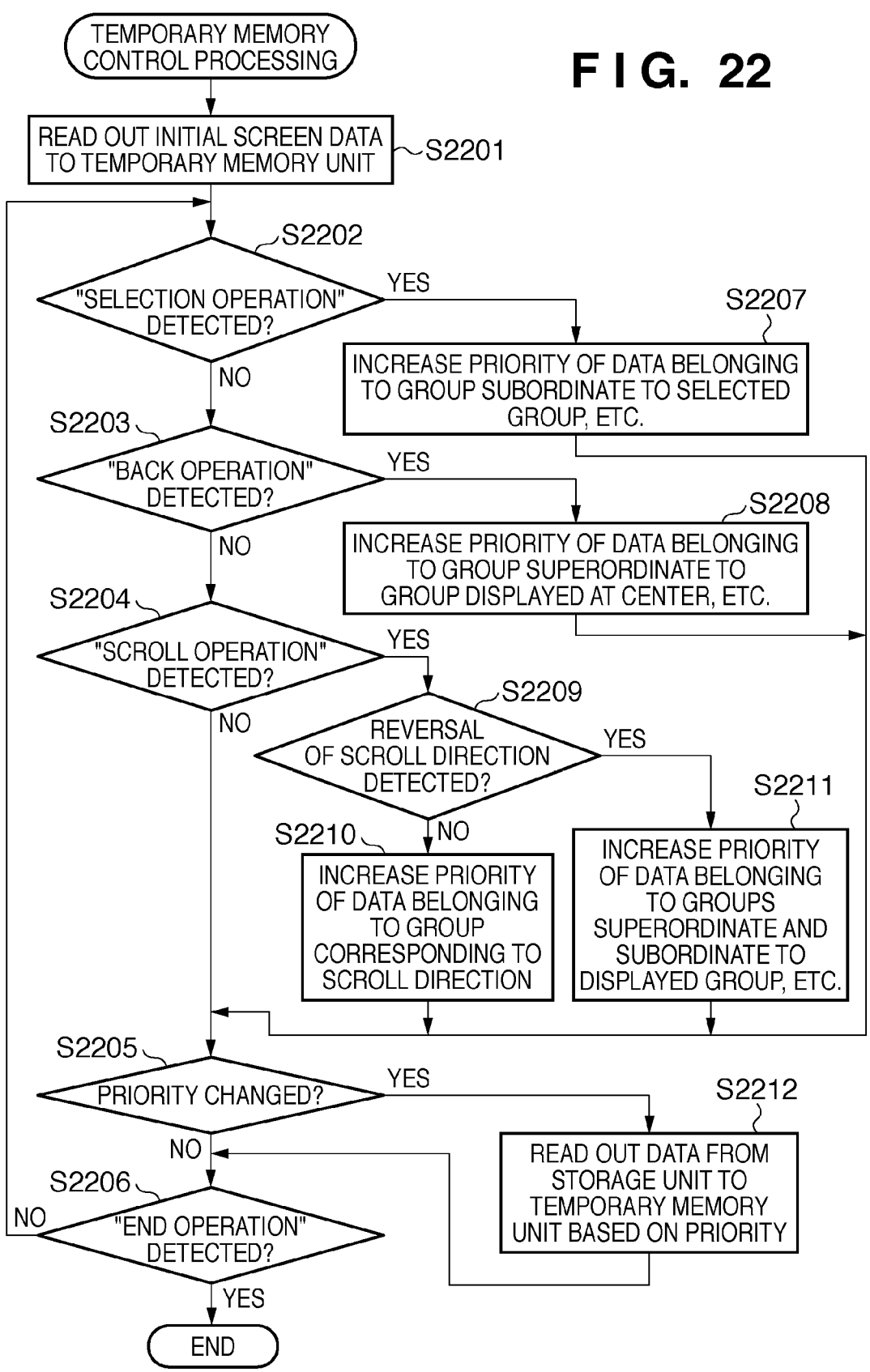
FIG. 22 is a flowchart exemplifying the sequence of temporary memory control processing in an information processing apparatus 1 according to the sixth embodiment.

FIG. 22 is a flowchart exemplifying the sequence of temporary memory control processing in the information processing apparatus 1 according to the sixth embodiment. Only processes different from those in FIG. 15 according to the fourth embodiment, that is, processes (S2204 and S2209 to S2211) pertaining to the "scroll operation" will be explained.

If the operation input detection unit 101 detects the "scroll operation" (YES in S2204), the information processing apparatus 1 causes a transition pre-stop determination unit 107 to determine a state immediately before transition of the display screen stops. In the sixth embodiment, this state is determined by determining whether the scroll direction (transition direction) has been reversed. A decrease of the scroll speed is determined in the fourth embodiment, while reversal of the scroll direction is determined in the sixth embodiment. Reversal of the scroll direction is detected by, for example, storing a previous operation and comparing the stored operation with an input operation. More specifically, when the user pressed the left button 2102 before and presses the right button 2103 now, it is detected that the scroll direction has been reversed.

If reversal of the scroll direction is detected (YES in S2209), the information processing apparatus 1 causes a priority setting unit 108 to increase the priority of data belonging to groups superordinate and subordinate to the displayed one. At this time, the priority setting unit 108 also increases the priority of data having a predetermined relevance with the superordinate and subordinate groups (S2211). Similar to the fourth embodiment, data having a predetermined relevance with superordinate and subordinate groups mean data falling within a predetermined range from data which belong to the superordinate and subordinate groups and are displayed on the display screen.

If reversal of the scroll direction is not detected (NO in S2209), the information processing apparatus 1 causes the priority setting unit 108 to increase the priority of data belonging to a group at a position corresponding to the scroll direction on the display screen (S2210). Increasing the priority of data is to increase the priority relatively to another data or change it to a predetermined value.

As described above, according to the sixth embodiment, a state immediately before transition of the display screen stops is determined by detecting reversal of the scroll direction. Similar to the fourth embodiment, the sixth embodiment increases the efficiency of memory utilization for read-ahead processing even immediately after transition of the display screen stops. Further, the sixth embodiment provides smooth screen transition.

Also in the "jump operation" described in the fifth embodiment, when reversal of the direction is detected, the same processing as the foregoing one may be executed.

Seventh Embodiment

The seventh embodiment will be described. A system configuration according to the seventh embodiment is the same as that in FIG. 10 according to the fourth embodiment, and a description thereof will not be repeated. A difference of the seventh embodiment from the fourth embodiment will be mainly explained.

The seventh embodiment will be explained using a preview screen 1601 in FIG. 16 described in the fifth embodiment. Similar to the fifth embodiment, data are arranged from left to right in ascending order of shooting date & time on the preview screen 1601 according to the seventh embodiment.

In the seventh embodiment, similar to the fourth embodiment, an operation input unit 2 is formed from a touch panel. In the seventh embodiment, only the "scroll operation" and "end operation" are instructed. For example, when the user slides his finger to the left on the screen, all the displayed thumbnails shift (are scrolled) to the left and the thumbnail of data having an older shooting date & time appears from the right. Similarly, when the user slides his finger to the right, all the displayed thumbnails shift (are scrolled) to the right and the thumbnail of data having an older shooting date & time appears from the left. The scroll speed changes in proportion to the speed at which the finger slides.

Figure 23:
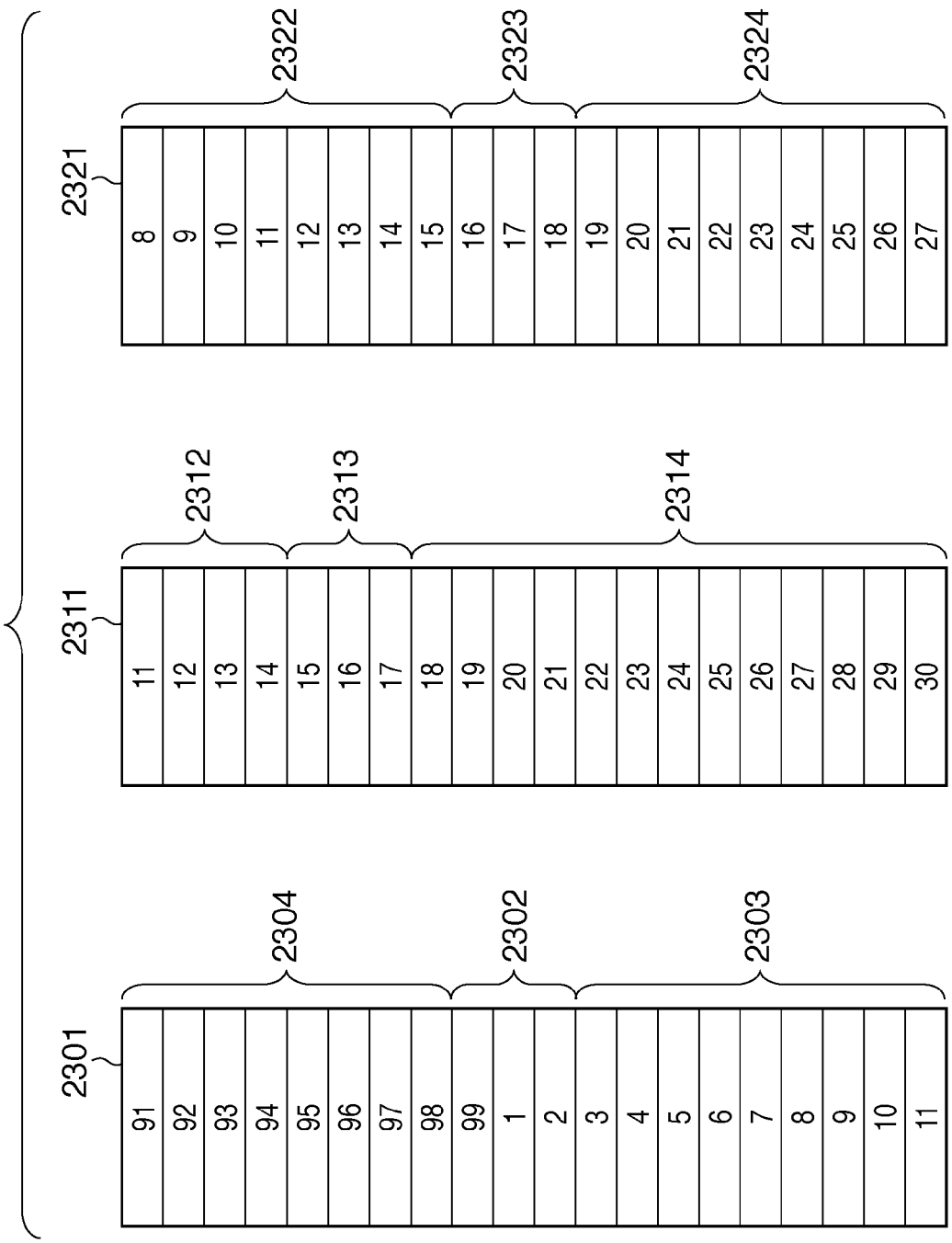
FIG. 23 is a view exemplifying a data structure in a temporary memory unit 105 according to the seventh embodiment.

FIG. 23 is a view exemplifying a data structure in a temporary memory unit 105 according to the seventh embodiment.

Reference numeral 2301 denotes a data structure in the temporary memory unit 105 when an initial screen is displayed. Assume that the initial screen is the preview screen 1601 shown in FIG. 16, and the thumbnail of the first data in sorting order is displayed in a focused thumbnail display region 1602.

Reference numeral 2302 denotes currently displayed thumbnail data; 2303, right scroll data; and 2304, left scroll data. When the initial screen is displayed, the temporary memory unit 105 stores actually displayed thumbnail data and scroll data.

Reference numeral 2311 denotes a data structure in the temporary memory unit 105 when a display unit 3 displays the preview screen 1601 and the operation state at this time is the pre-stop undetected state. Reference numeral 2312 denotes left scroll data; 2313, currently displayed data; and 2314, right scroll data.

Reference numeral 2321 denotes a data structure in the temporary memory unit 105 when the display unit 3 displays the preview screen 1601 and the operation state at this time is the pre-stop state. Reference numeral 2322 denotes left scroll data; 2323, currently displayed data; and 2324, right scroll data. The temporary memory unit 105 stores right scroll data and left scroll data at a ratio which changes between the pre-stop state and the pre-stop undetected state. Note that the data structures 2311 and 2321 are those in the temporary memory unit 105 during right scrolling. During left scrolling, the ratio of right scroll data and left scroll data in each of the data structures 2311 and 2321 is reversed.

Figure 24:
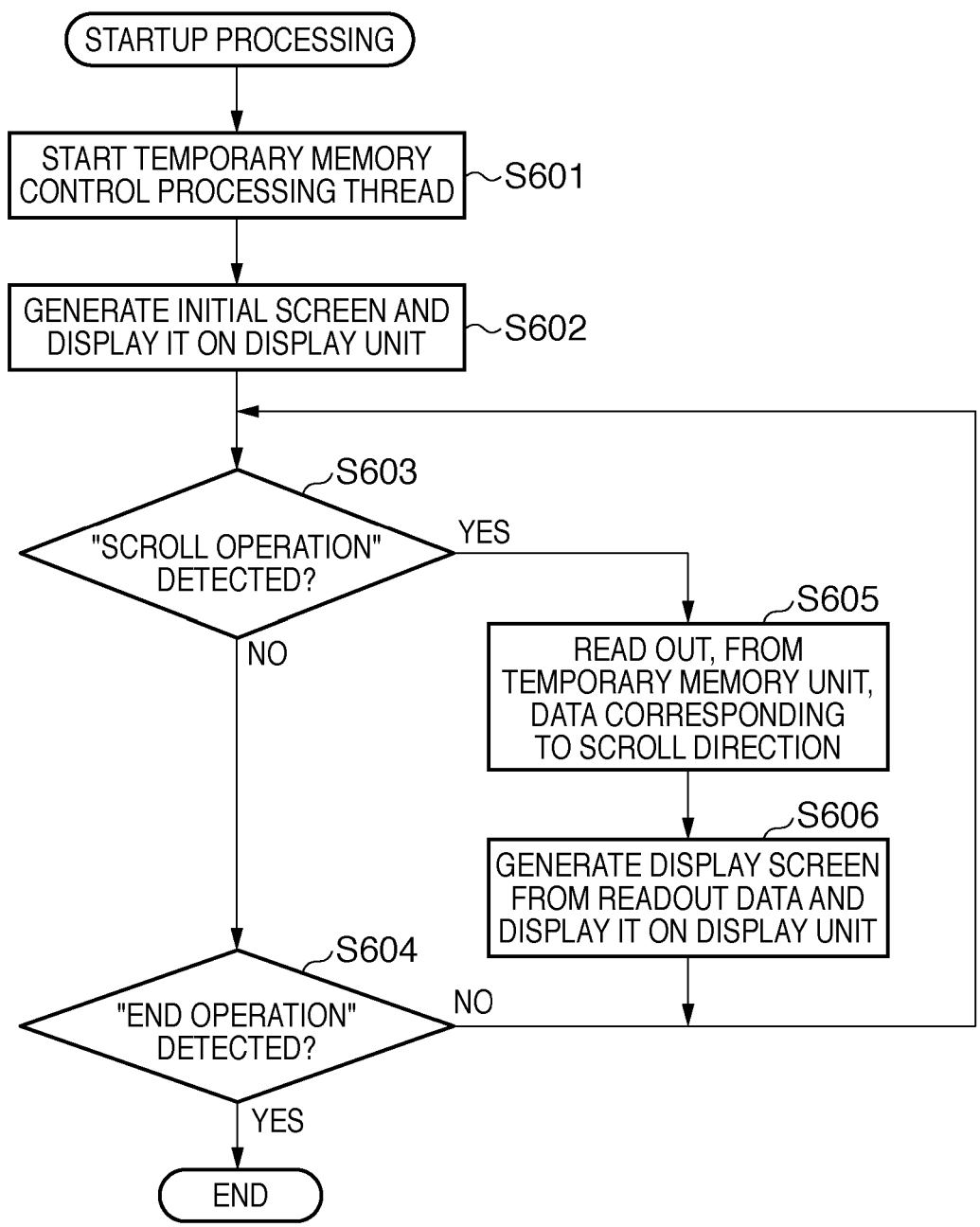
FIG. 24 is a flowchart exemplifying the sequence of startup processing in an information processing apparatus 1 according to the seventh embodiment.
Figure 25:
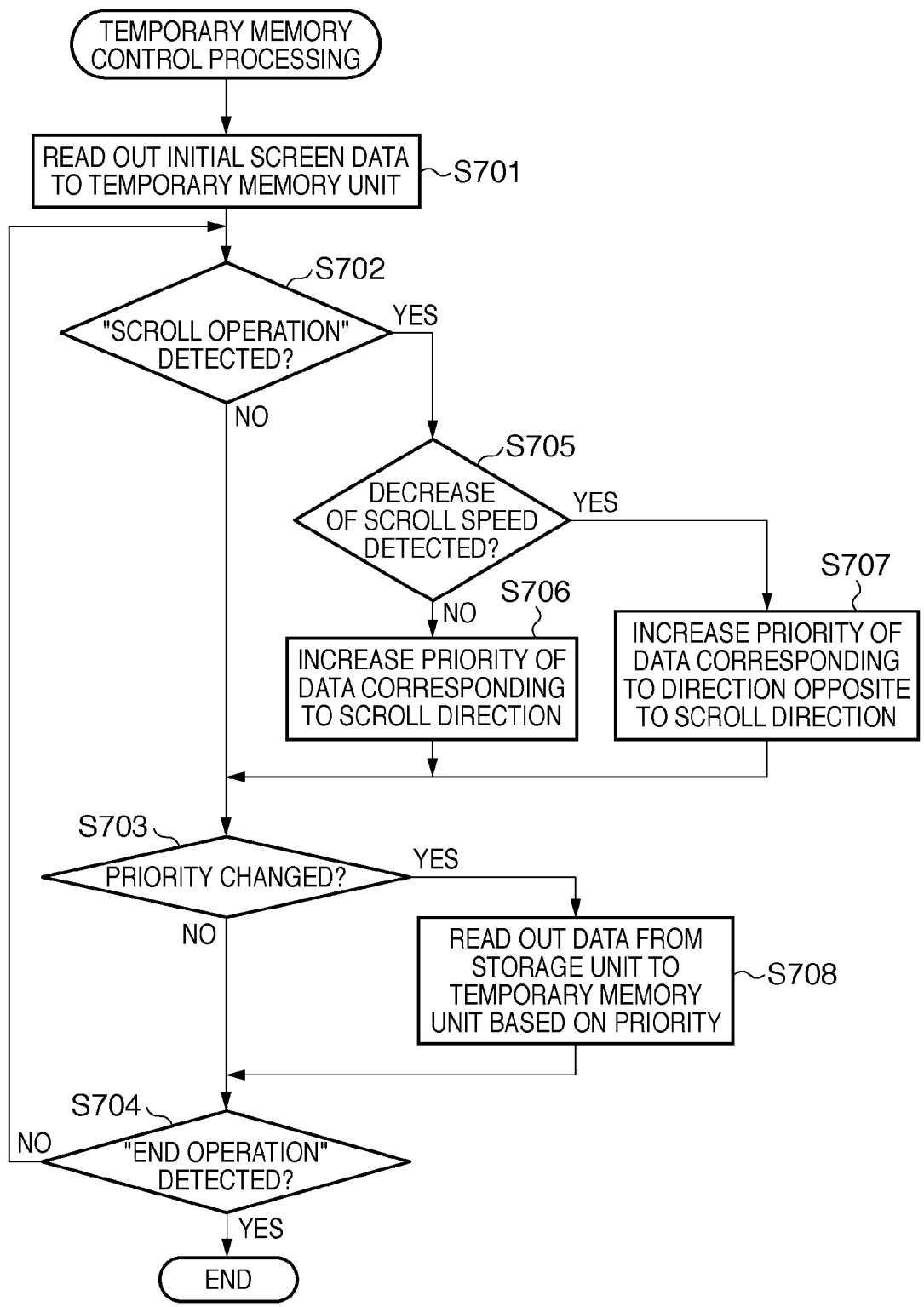
FIG. 25 is a flowchart exemplifying the sequence of temporary memory control processing in the information processing apparatus 1 according to the seventh embodiment.

An operation in an information processing apparatus 1 according to the seventh embodiment will be exemplified with reference to FIGS. 24 and 25.

FIG. 24 is a flowchart exemplifying the sequence of startup processing in the information processing apparatus 1 according to the seventh embodiment.

First, the information processing apparatus 1 starts a temporary memory control processing thread (S601). More specifically, the information processing apparatus 1 reads out data from a storage unit 4 to the temporary memory unit 105. The information processing apparatus 1 causes a display control unit 106 to read out data from the temporary memory unit

105, generate an initial screen from the readout data, and output the generated display screen to the display unit 3 to display it (S602).

After displaying the screen, the information processing apparatus 1 waits until an operation input detection unit 101 detects an operation input signal from the operation input unit 2 (NO in S603 and then NO in S604). More specifically, the information processing apparatus 1 waits until the user inputs either the "scroll operation" or "end operation".

If the operation input detection unit 101 detects the "scroll operation" (YES in S603), the information processing apparatus 1 causes the display control unit 106 to read out, from the temporary memory unit 105, data at a position corresponding to the scroll direction on the display screen (S605). The information processing apparatus 1 causes the display control unit 106 to generate a display screen based on the data read out from the temporary memory unit 105 and output the generated display screen to the display unit 3 (S606). Thereafter, the process returns again to S603.

If the operation input detection unit 101 detects the "end operation" (YES in S604), the processing ends. If the operation input detection unit 101 does not detect the "end operation" (NO in S604), the process returns to S603 again. If the temporary memory unit 105 does not store data to be read out in the process of S605, for example, the display screen temporarily becomes blank. Alternatively, data are read out from the storage unit 4 and displayed.

FIG. 25 is a flowchart exemplifying the sequence of temporary memory control processing in the information processing apparatus 1 according to the seventh embodiment.

After the processing starts, the information processing apparatus 1 causes a temporary memory control unit 104 to read out initial screen data from the storage unit 4 to the temporary memory unit 105 (S701). Then, the information processing apparatus 1 waits until the operation input detection unit 101 detects an operation input signal from the operation input unit 2 (NOs in S702 to S704). More specifically, the information processing apparatus 1 waits until the user inputs either the "scroll operation" or "end operation".

If the operation input detection unit 101 detects the "scroll operation" (YES in S702), the information processing apparatus 1 causes a transition pre-stop determination unit 107 to determine a state immediately before transition of the display screen stops. In the seventh embodiment, this state is determined by determining whether the scroll speed in the scroll direction (transition direction) has decreased. The decrease of the scroll speed is detected from, for example, the speed at which the finger slides on the screen.

If a decrease of the scroll speed is detected (YES in S705), the information processing apparatus 1 causes a priority setting unit 108 to increase the priority of data at a position corresponding to a direction opposite to the scroll direction on the display screen (S707).

If no decrease of the scroll speed is detected (NO in S705), the information processing apparatus 1 causes the priority setting unit 108 to increase the priority of data at a position corresponding to the scroll direction on the display screen (S706). Increasing the priority of data is to increase the priority relatively to another data or change it to a predetermined value. When increasing the priority in an opposite direction, the priority of data may be set higher than that of data in a direction opposite to that upon detecting no decrease in speed.

If the information processing apparatus 1 detects a change of the priority after the above-mentioned process (YES in S703), it causes the temporary memory control unit 104 to read out data from the storage unit 4 based on the priority and store it in the temporary memory unit 105 (S708). If the operation input detection unit 101 detects the "end operation" (YES in S704), the processing ends. If the operation input detection unit 101 does not detect the "end operation" (NO in S704), the process returns to S702 again.

As described above, similar to the fourth embodiment, the seventh embodiment increases the efficiency of memory utilization for read-ahead processing even immediately after transition of the display screen stops. Also, the seventh embodiment implements smooth screen transition.

Typical embodiments of the present invention have been described above. However, the present invention is not limited to the aforementioned and illustrated embodiments, and can be properly modified without departing from the scope of the invention.

The present invention can adopt embodiments of a system, apparatus, method, program, storage medium, and the like. More specifically, the present invention is applicable to a system formed from a plurality of devices or an apparatus formed from one device.

The present invention can realize a highly interactive user interface with a quick response because the cache hit rate increases.

The present invention increases the efficiency of memory utilization for read-ahead processing even immediately after transition of the display screen stops. Further, the present invention provides smooth screen transition because data can be read out quickly even immediately after transition of the display screen stops.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-297095 filed on Nov. 20, 2008, and 2009-003993 filed on Jan. 9, 2009, which are hereby incorporated by reference herein in their entirety.

What is claimed is:
1. An information processing system comprising:
a storage unit configured to store data of a plurality of content items which have a predetermined order and are displayable on a display device at different display qualities for each content item;
a display control unit configured to display a part of the plurality of content items on the display device based on the data of the content stored in the storage unit;
a detection unit configured to detect a user operation to instruct switching of a content item displayed on the display device;

an obtaining unit configured to obtain a switching speed of content display on the display device based on the user operation detected by said detection unit; and a control unit configured to cause the storage unit to store content data to be displayed at a first display quality for each content item from an Nth item to an (N+K)th item in the predetermined order in a case where the switching speed obtained by the obtaining unit is a first speed, and to cause the storage unit to store content data to be displayed at the first display quality for each content item from an Mth item to an (M+L)th (L>K) item in the predetermined order in a case where the switching speed obtained by the obtaining unit is a second speed which is faster than the first speed;

wherein in a case where the switching speed is the second speed, the control unit makes a distribution of content data which is to be displayed at a second display quality, which is higher than the first display quality, in content data which is stored in the storage unit to be smaller than the distribution in a case where the switching speed is the first speed.

2. The system according to claim 1, wherein said obtaining unit obtains the number of content items newly displayed per unit time on the display device based on the user operation detected by said detection unit, and makes the obtaining based on the number of content items.

3. The system according to claim 1, wherein said obtaining unit obtains a display time interval of a content until the content item is newly displayed on the display device based on the user operation detected by said detection unit, and makes the obtaining based on the display time interval.

4. The system according to claim 1, wherein said control unit decides the distribution for content data of each display quality which is to be stored in the storage unit based on an increase/decrease of the switching speed of content display per unit time that is obtained by said obtaining unit.

5. The system according to claim 1, wherein said control unit, when the switching speed of content display per unit time that is obtained by said obtaining unit is changed, changes the distribution of content data which is to be displayed by the first display quality and the distribution of content data which is to be displayed by the second display quality, in content data which is stored in the storage unit.

6. The system according to claim 1, wherein the plurality of display qualities are gradually discriminated based on difference of one of content resolution, compression rate, and color space size.

7. An information processing apparatus comprising:
a storage unit configured to store data of a plurality of content items which have a predetermined order and are displayable on a display device at different display qualities for each content item;
a display control unit configured to display a part of the plurality of content items on the display device based on the data of the content stored in the storage unit;
a detection unit configured to detect a user operation to instruct switching of a content item displayed on the display device;
an obtaining unit configured to obtain a switching speed of content display on the display device based on the user operation detected by said detection unit; and
a control unit configured to cause the storage unit to store content data to be displayed at a first display quality for each content item from an Nth item to an (N+K)th item in the predetermined order in a case where the switching speed obtained by the obtaining unit is a first speed, and to cause the storage unit to store content data to be displayed at the first display quality for each content item from an Mth item to an (M+L)th (L>K) item in the predetermined order in a case where the switching speed obtained by the obtaining unit is a second speed which is faster than the first speed;

wherein in a case where the switching speed is the second speed, the control unit makes a distribution of content data which is to be displayed at a second display quality, which is higher than the first display quality, in content data which is stored in the storage unit to be smaller than the distribution in a case where the switching speed is the first speed.

8. A display processing method for an information processing apparatus including a storage unit configured to store data of a plurality of content items which have a predetermined order and are displayable on a display device at different display qualities for each content item, the method comprising:

a displaying step of displaying a part of the plurality of content items on the display device based on the data of the content stored in the storage unit;

a detecting step of detecting a user operation to instruct switching of a content item displayed on the display device;

an obtaining step of obtaining a switching speed of content display on the display device based on the user operation detected in the detecting step; and a controlling step of causing the storage unit to store content data to be displayed at a first display quality for each content item from an Nth item to an (N+K)th item in the predetermined order in a case where the switching speed obtained in the obtaining step is a first speed, and causing the storage unit to store content data to be displayed at the first display quality for each content item from an Mth item to an (M+L)th (L>K) item in the predetermined order in a case where the switching speed obtained in the obtaining step is a second speed which is faster than the first speed;

wherein in a case where the switching speed is the second speed, in the controlling step, distribution of content data is made which is to be displayed at a second display quality, which is higher than the first display quality, in content data which is stored in the storage unit to be smaller than the distribution in a case where the switching speed is the first speed.

9. A computer-readable storage medium storing a computer program for causing a computer to function as a storage unit configured to store data of a plurality of content items which have a predetermined order and are displayable on a display device at different display qualities for each content item;

a display control unit configured to display a part of the plurality of content items on the display device based on the data of the content stored in the storage unit, a detection unit configured to detect a user operation to instruct switching of a content item displayed on the display device, an obtaining unit configured to obtain a switching speed of content display on the display device based on the user operation detected by said detection unit, and a control unit configured to cause the storage unit to store content data to be displayed at a first display quality for each content item from an Nth item to an (N+K)th item in the predetermined order in a case where the switching speed obtained by the obtaining unit is a first speed, and to cause the storage unit to store content data to be displayed at the first display quality for each content item from an Mth item to an (M+L)th (L>K) item in the predetermined order in a case where the switching speed obtained by the obtaining unit is a second speed which is faster than the first speed;

wherein in a case where the switching speed is the second speed, the control unit makes a distribution of content data which is to be displayed at a second display quality, which is higher than the first display quality, in content data which is stored in the storage unit to be smaller than the distribution in a case where the switching speed is the first speed.

10. An information processing apparatus comprising:

a temporary memory unit configured to temporarily store, as a plurality of candidates which may be displayed on a display device, a plurality of data items read out from a storage unit;

a display control unit configured to generate a display screen which includes a part of the data selected out of the plurality of candidates temporarily stored in said temporary memory unit and display the display screen on the display device;

a detection unit configured to detect input of an operation to instruct transition of the display screen;

a determination unit configured to determine, based on a detection result of said detection unit, a pre-stop state representing a state immediately before input of the operation to instruct transition of the display screen stops; and a control unit configured to perform control to read out, from the storage unit to said temporary memory unit, as a plurality of data candidates which is to be displayed on the display device, a plurality of data decided based on the detection result of said detection unit and a determination result of said determination unit, wherein when said determination unit determines that the operation is not in the pre-stop state, said control unit decides the plurality of data which are to be stored in the temporary memory unit, by regarding data displayed in a transition direction instructed by the operation detected on the display screen, as the plurality of candidates, and when said determination unit determines that the operation is in the pre-stop state, said control unit decides the plurality of data which are to be stored in the temporary memory unit as the plurality of candidates, so that a data ratio displayed in a transition direction instructed by the operation detected on the display screen, out of a plurality of data which are to be read out as a plurality of data candidates which are to be displayed on the display device, is made to be less than the data ratio when said determination unit determines that the operation is not in the pre-stop state.

11. The apparatus according to claim 10, wherein said detection unit detects input of a scroll operation to instruct transition of the display screen by scrolling data displayed on the display screen in a predetermined direction, and when a speed instructed by the scroll operation to change the display screen has decreased, said determination unit determines that the scroll operation is in the pre-stop state.

12. The apparatus according to claim 10, wherein said detection unit detects input of a scroll operation to instruct transition of the display screen by scrolling data displayed on the display screen in a predetermined direction, and when a transition direction of the display screen that is instructed by the scroll operation has been reversed, said determination unit determines that the scroll operation is in the pre-stop state.

13. The apparatus according to claim 10, wherein said detection unit detects input of a jump operation to instruct transition of the display screen by jumping at least one data displayed on the display screen in a predetermined direction, and when the number of data jumped in transition of the display screen that is instructed by the jump operation has decreased, said determination unit determines that the jump operation is in the pre-stop state.

14. The apparatus according to claim 10, wherein said detection unit detects input of a jump operation to instruct transition of the display screen by jumping at least one data displayed on the display screen in a predetermined direction, and when a transition direction of the display screen that is instructed by the jump operation has been reversed, said determination unit determines that the jump operation is in the pre-stop state.

15. The apparatus according to claim 10, wherein when said determination unit determines that the operation is in the pre-stop state, said control unit performs a decision and readout control of a plurality of data which is to be stored in the temporary memory unit as the plurality of candidates, so that, in a plurality of data items which are to be read out as a plurality of data candidates which are to be displayed on the display device, a ratio of data displayed in a transition direction instructed by the detected operation on the display screen is made to be smaller, and a ratio of data used on a display screen which can be transitioned from a display screen currently displayed on the display device is made to be larger, and a ratio of data displayed within a predetermined range from a position where the data is displayed on the display screen is made to be larger, than when said determination unit determines that the operation is not in the pre-stop state.

16. The apparatus according to claim 10, wherein when said determination unit determines that the operation is in the pre-stop state, said memory control unit performs a decision and readout control of a plurality of data which is to be stored in the temporary memory unit as the plurality of candidates, so that, in a plurality of data items which are to be read out as a plurality of data candidates which are to be displayed on the display device, a ratio of data displayed in a transition direction instructed by the detected operation on the display screen is made to be smaller, and a ratio of data displayed in a direction opposite to a transition direction instructed by the detected operation on the display screen is made to be larger, than when said determination unit determines that the operation is not in the pre-stop state.

17. The apparatus according to claim 10, wherein when said display device is a touch panel display and wherein said detection unit detects a motion of finger which is moved to right and left on the touch panel display, as an input of scroll operation which instructs a transition of the display screen by scrolling data displayed on the display screen to a predetermined direction.

18. A display processing method for an information processing apparatus, the method comprising the steps of:
generating a display screen which includes a part of the data selected out of the plurality of candidates stored in a temporary memory unit which temporarily stores, as a plurality of candidates which may be displayed on a display device, a plurality of data items read out from a storage unit, thereby displaying the display screen on a display device;
detecting input of an operation to instruct transition of the display screen;
determining, based on a detection result of the detecting step, a pre-stop state representing a state immediately before input of the operation to instruct transition of the display screen stops; and
performing control to read out, from the storage unit to the temporary memory unit, as a plurality of data candidates which is to be displayed on the display device, a plurality of data decided based on the detection result of the detecting step and a determination result of the determining step,
wherein when it is determined in the determining step that the operation is not in the pre-stop state, in the step of performing control, the plurality of data are decided which are to be stored in the temporary memory unit, by regarding data displayed in a transition direction instructed by the operation detected on the display screen, as the plurality of candidates, and
when it is determined in the determining step that the operation is in the pre-stop state, in the step of performing control, the plurality of data are decided which are to be stored in the temporary memory unit as the plurality of candidates, so that a data ratio displayed in a transition direction instructed by the operation detected on the display screen, out of a plurality of data which are to be read out as a plurality of data candidates which are to be displayed on the display device, is made to less than the data ration when it is determined in the determining step that the operation is not in the pre-stop state.

19. A computer-readable storage medium storing a computer program for causing a computer to function as
a display control unit configured to generate a display screen which includes a part of data selected out of the plurality of candidates stored in a temporary memory unit which temporarily stores, as a plurality of candidates which may be displayed on a display device a plurality of data items read out from a storage unit, thereby displaying the display screen on the display device,
a detection unit configured to detect input of an operation to instruct transition of the display screen,
a determination unit configured to determine, based on a detection result of said detection unit, a pre-stop state representing a state immediately before input of the operation to instruct transition of the display screen stops, and
a control unit configured to perform control to read out, from the storage unit to the temporary memory unit, as a plurality of data candidates which is to be displayed on the display device, a plurality of data decided based on the detection result of said detection unit and a determination result of said determination unit,
wherein when said determination unit determines that the operation is not in the pre-stop state, said control unit decides the plurality of data which are to be stored in the temporary memory unit, by regarding data displayed in a transition direction instructed by the operation detected on the display screen, as the plurality of candidates, and
when said determination unit determines that the operation is in the pre-stop state, said control unit decides the plurality of data which are to be stored in the temporary memory unit as the plurality of candidates, so that a data ratio displayed in a transition direction instructed by the operation detected on the display screen, out of a plurality of data which are to be read out as a plurality of data candidates which are to be displayed on the display device, is made to be less than the data ratio when said determination unit determines that the operation is not in the pre-stop state.

* * * * *